(12) United States Patent
Hakim

(10) Patent No.: US 11,602,738 B2
(45) Date of Patent: Mar. 14, 2023

(54) AROMATIZATION CATALYST ACTIVITY AND SELECTIVITY IMPROVEMENT WITH ALCOHOL ADDITION DURING CATALYST PREPARATION

(71) Applicant: Chevron Phillips Chemical Company LP, The Woodlands, TX (US)

(72) Inventor: Sikander Hakim, Kingwood, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 7 days.

(21) Appl. No.: 17/376,303

(22) Filed: Jul. 15, 2021

(65) Prior Publication Data

US 2022/0016610 A1     Jan. 20, 2022

Related U.S. Application Data

(60) Provisional application No. 63/053,006, filed on Jul. 17, 2020.

(51) Int. Cl.
| | |
|---|---|
| *B01J 29/62* | (2006.01) |
| *B01J 35/02* | (2006.01) |
| *B01J 37/02* | (2006.01) |
| *B01J 37/04* | (2006.01) |
| *B01J 37/06* | (2006.01) |
| *B01J 37/24* | (2006.01) |
| *B01J 37/26* | (2006.01) |
| *B01J 29/04* | (2006.01) |

(52) U.S. Cl.
CPC ............ *B01J 29/62* (2013.01); *B01J 29/043* (2013.01); *B01J 35/02* (2013.01); *B01J 37/0201* (2013.01); *B01J 37/04* (2013.01); *B01J 37/06* (2013.01); *B01J 37/24* (2013.01); *B01J 37/26* (2013.01)

(58) Field of Classification Search
CPC . B01J 29/62; B01J 29/043; B01J 35/02; B01J 37/0201; B01J 37/04; B01J 37/06; B01J 37/24; B01J 37/26; B01J 37/0203; C10G 35/085; C10G 45/70
USPC ............................. 502/60, 62, 63, 64, 66, 74
See application file for complete search history.

(56) References Cited

U.S. PATENT DOCUMENTS

| | | |
|---|---|---|
| 2,851,399 A | 9/1958 | Brennan |
| 4,456,527 A | 6/1984 | Buss |
| 5,196,631 A | 3/1993 | Murakawa |
| 5,389,235 A | 2/1995 | Russ |
| 5,401,365 A | 3/1995 | Chen |
| 5,401,386 A | 3/1995 | Morrison |
| 6,190,539 B1 | 2/2001 | Holtermann |
| 6,207,042 B1 | 3/2001 | Holtermann |
| 6,406,614 B1 | 6/2002 | Tiedtke |
| 6,518,470 B1 | 2/2003 | Fukunaga |
| 6,812,180 B2 | 11/2004 | Fukunaga |
| 7,153,801 B2 | 12/2006 | Wu |
| 7,569,508 B2 | 8/2009 | Zhou |
| 7,932,425 B2 | 4/2011 | Blessing |
| 10,118,167 B2 | 11/2018 | Snell |
| 2002/0193240 A1 | 12/2002 | Fukunaga |
| 2004/0259719 A1* | 12/2004 | Wu ................. B01J 37/0203 502/64 |
| 2006/0102521 A1 | 5/2006 | Zhou |
| 2008/0027255 A1 | 1/2008 | Blessing |
| 2018/0169640 A1 | 6/2018 | Snell |
| 2018/0311645 A1 | 11/2018 | Han |
| 2018/0333705 A1 | 11/2018 | Snell |
| 2021/0115341 A1 | 4/2021 | Sampath |

FOREIGN PATENT DOCUMENTS

| | | |
|---|---|---|
| WO | 2018049033 A1 | 3/2018 |
| WO | 2018211365 A1 | 11/2018 |

OTHER PUBLICATIONS

International Search Report and Written Opinion for PCT/US2021/041849 dated Jan. 20, 2022. 9 pages.
Carvalho, Ind. Eng. Chem. Res. 2001, 40, 5557-5563.
Lekhal, 'Drying of Supported Catalysts' in 'Catalyst Preparation; Science and Engineering' Regalbuto Ed., Apr. 19, 2016.
Song, Journal of Dispersion Science and Technology, 29:1367-1372, 2008.
Zangeneh et al. "The Influence of Solvent on the Performance of Pt-Synthetic: A1203 Propane Dehydrogenation Catalyst Prepared by Co-Impregnation Method." Fuel Processing Technology. vol. 109. May 1, 2013. pp. 118-132.

* cited by examiner

*Primary Examiner* — Elizabeth D Wood
(74) *Attorney, Agent, or Firm* — Merchant & Gould P.C.

(57) ABSTRACT

Methods for producing supported catalysts containing a transition metal and a bound zeolite base are disclosed. These methods employ a step of impregnating the bound zeolite base with a transition metal precursor in a solvent composition containing water and from about 5 wt. % to about 50 wt. % of a $C_1$ to $C_3$ alcohol compound, a chlorine precursor, and a fluorine precursor. The resultant supported catalysts have improved catalyst activity and selectivity, as well as lower fouling rates in aromatization reactions.

20 Claims, 22 Drawing Sheets

AROMATIZATION CATALYST ACTIVITY AND SELECTIVITY IMPROVEMENT WITH ALCOHOL ADDITION DURING CATALYST PREPARATION

REFERENCE TO RELATED APPLICATION

This application claims the benefit of U.S. Provisional Patent Application No. 63/053,006, filed on Jul. 17, 2020, the disclosure of which is incorporated herein by reference in its entirety.

FIELD OF THE INVENTION

The present disclosure concerns methods for producing supported catalysts, and more particularly relates to the production of supported aromatization catalysts containing a transition metal and a bound zeolite base using a catalyst impregnation step in which a water/alcohol mixture is used.

BACKGROUND OF THE INVENTION

The catalytic conversion of non-aromatic hydrocarbons into aromatic compounds, often referred to as aromatization or reforming, is an important industrial process that can be used to produce benzene, toluene, xylenes, and the like. The aromatization or reforming process often is conducted in a reactor system that can contain one or more reactors containing transition metal based catalysts. These catalysts can increase the selectivity to and/or the yield of the desired aromatic compounds. These catalysts also slowly lose their activity over time, often indicated by a loss of the selectivity to desired aromatic compounds and/or a reduction in conversion rates.

It would be beneficial to have an improved aromatization catalyst that offers high catalyst activity and selectivity, low fouling rates, and stability over long production runs. Accordingly, it is to these ends that the present disclosure is principally directed.

SUMMARY OF THE INVENTION

Methods for producing supported catalysts are disclosed and described herein. Such methods can comprise (a) impregnating a bound zeolite base with, in any order, a transition metal precursor in a solvent composition containing water and from about 5 wt. % to about 50 wt. % of a $C_1$ to $C_3$ alcohol compound, a chlorine precursor, and a fluorine precursor, to form an impregnated zeolite base, and (b) drying and then calcining the impregnated zeolite base to produce the supported catalyst. Generally, the supported catalyst can comprise, based on the total weight of the supported catalyst, from about 0.1 wt. % to about 10 wt. % of a transition metal, from about 0.1 wt. % to about 5 wt. % of chlorine, and from about 0.1 wt. % to about 5 wt. % of fluorine.

Supported catalysts produced by the methods provided herein can be used in aromatization processes to produce aromatic compounds from non-aromatic hydrocarbons. Such catalysts can have the unexpected combination of increased catalyst activity and reduced fouling rates, while maintaining excellent selectivity (e.g., to benzene and toluene).

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
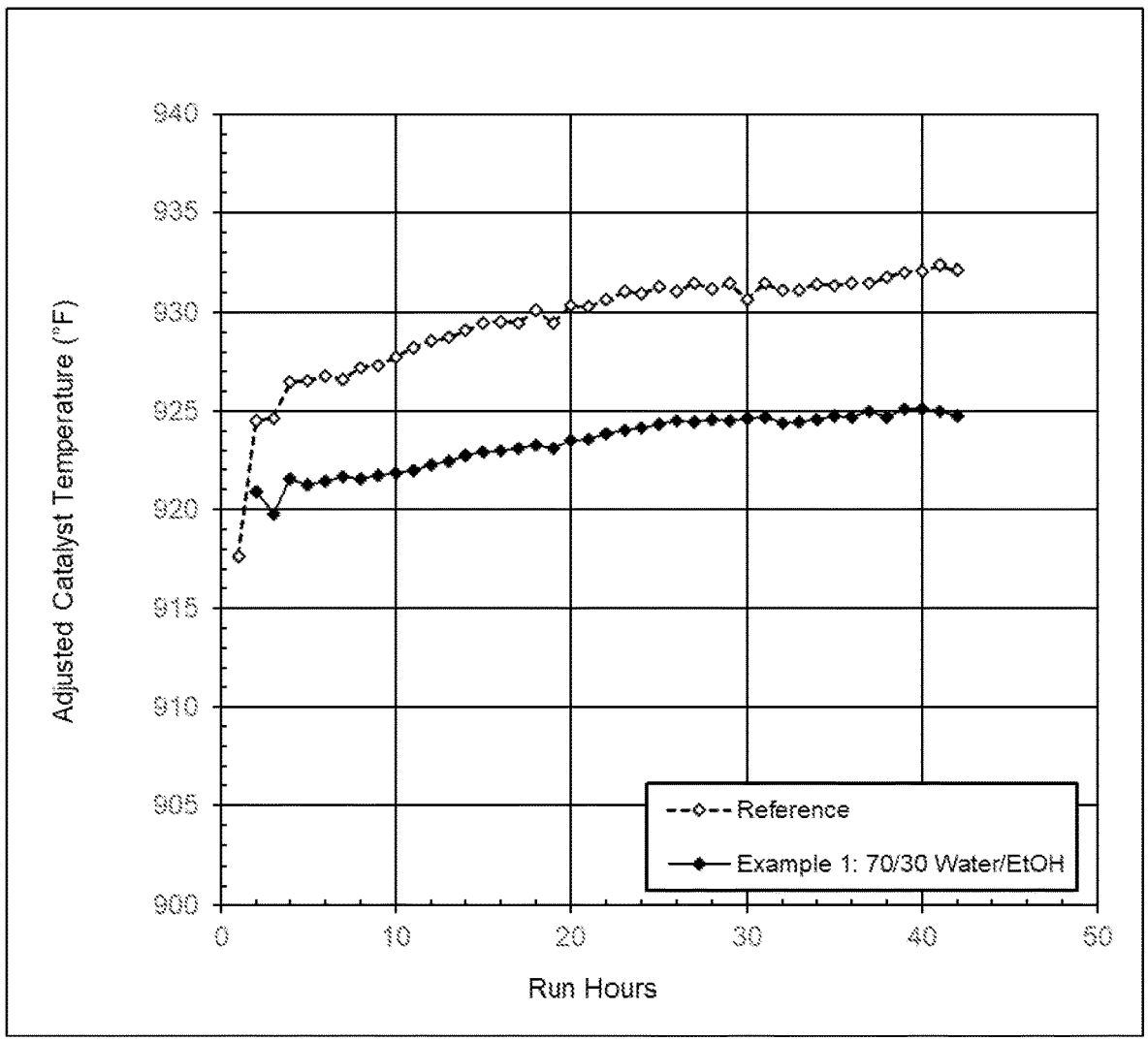
FIG. 1 presents a plot of the yield-adjusted temperature versus reaction time for the supported catalysts of Example 1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the designs, compositions, processes, or methods described herein are contemplated with or without explicit description of the particular combination. Additionally, unless explicitly recited otherwise, any aspect or feature disclosed herein can be combined to describe inventive designs, compositions, processes, or methods consistent with the present disclosure.

In this disclosure, while compositions and methods are often described in terms of "comprising" various components or steps, the compositions and methods also can "consist essentially of" or "consist of" the various components or steps, unless stated otherwise.

The terms "a," "an," and "the" are intended to include plural alternatives, e.g., at least one. For instance, the disclosure of "a transition metal" or "a chlorine precursor," is meant to encompass one, or mixtures or combinations of more than one, transition metal or chlorine precursor, unless otherwise specified.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, transition metals for Group 3-12 elements, and halogens or halides for Group 17 elements.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For example, a general reference to hexane includes n-hexane, 2-methyl-pentane, 3-methyl-pentane, 2,2-dimethyl-butane, and 2,3-dimethyl-butane; and a general reference to a butyl group includes a n-butyl group, a sec-butyl group, an iso-butyl group, and a t-butyl group.

In one aspect, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to metal atoms. By way of example, an "alkyl group" formally can be derived by removing one hydrogen atom from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that the supported catalysts can contain, in certain aspects, from about 1.8 wt. % to about 3.2 wt. % of chlorine, based on the total weight of the supported catalyst. By a disclosure that the chlorine content of the supported catalyst can be in a range from about 1.8 wt. % to about 3.2 wt. %, the intent is to recite that the chlorine content can be any amount within the range and, for example, can be equal to about 1.8 wt. %, about 2 wt. %, about 2.2 wt. %, about 2.4 wt. %, about 2.6 wt. %, about 2.8 wt. %, about 3 wt. %, or about 3.2 wt. %. Additionally, the chlorine content can be within any range from about 1.8 wt. % to about 3.2 wt. % (for example, the chlorine content can be in a range about 2 wt. % to about 3 wt. %), and this also includes any combination of ranges between about 1.8 wt. % and about 3.2 wt. %. Further, in all instances, where "about" a particular value is disclosed, then that value itself is disclosed. Thus, the disclosure that the chlorine content can be from about 1.8 wt. % to about 3.2 wt. % also discloses a chlorine content in the range from 1.8 wt. % to 3.2 wt. % (for example, from 2 wt. % to 3 wt. %), and this also includes any combination of ranges between 1.8 wt. % and 3.2 wt. %. Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

As used herein, the term "hydrocarbon" refers to a compound containing only carbon and hydrogen atoms. Other identifiers can be utilized to indicate the presence of particular groups, if any, in the hydrocarbon (e.g., halogenated hydrocarbon indicates the presence of one or more halogen atoms replacing an equivalent number of hydrogen atoms in the hydrocarbon).

An "aromatic" compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds, e.g., benzene, toluene, and xylenes) and "heteroarenes" (heteroaromatic compounds formally derived from arenes by replacement of one or more methine (—C═) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2)). As disclosed herein, the term "substituted" can be used to describe an aromatic group, arene, or heteroarene, wherein a non-hydrogen moiety formally replaces a hydrogen atom in the compound, and is intended to be non-limiting, unless specified otherwise.

As used herein, the term "alkane" refers to a saturated hydrocarbon compound. Other identifiers can be utilized to indicate the presence of particular groups, if any, in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. The alkane or alkyl group can be linear or branched unless otherwise specified.

A "cycloalkane" is a saturated cyclic hydrocarbon, with or without side chains, for example, cyclobutane, cyclopentane, cyclohexane, methyl cyclopentane, and methyl cyclohexane. Other identifiers can be utilized to indicate the presence of particular groups, if any, in the cycloalkane (e.g., halogenated cycloalkane indicates the presence of one or more halogen atoms replacing an equivalent number of hydrogen atoms in the cycloalkane).

As used herein, the term "convertible hydrocarbon," "convertible $C_6$ species," or "convertible $C_7$ species" refers to a hydrocarbon compound that is readily reacted to form aromatic hydrocarbons under aromatization process conditions. A "non-convertible hydrocarbon" is a highly-branched hydrocarbon that is not readily reacted to form aromatic hydrocarbons under aromatization process conditions. A "non-convertible hydrocarbon" can comprise highly-branched hydrocarbons having six or seven carbon atoms with an internal quaternary carbon, or hydrocarbons having six carbons atoms and two adjacent internal tertiary carbons, or mixtures thereof. A "convertible $C_6$ species" is a hydrocarbon containing six carbons without an internal quaternary carbon or two adjacent internal tertiary carbons, for example, n-hexane, 2-methyl-pentane, 3-methyl-pentane, cyclohexane, and methyl cyclopentane. A "convertible $C_7$ species" is a hydrocarbon containing seven carbons without an internal quaternary carbon, for example, n-heptane, 2-methyl-hexane, 3-methyl-hexane, 2,3-dimethyl-pentane, 2,4-dimethyl-pentane, methyl cyclohexane, and dimethyl cyclopentane. The highly branched hydrocarbons with six or seven carbon atoms and an internal quaternary carbon can comprise, for example, 2,2-dimethylbutane, 2,2-dimethyl-pentane, 3,3-dimethylpentane, and 2,2,3-trimethylbutane. The highly branched hydrocarbons with six carbon atoms and an adjacent internal tertiary carbon can comprise, for example, 2,3-dimethylbutane. The non-convertible highly branched hydrocarbons do not easily convert to aromatic products and instead tend to convert to light hydrocarbons under aromatization process conditions.

The term "halogen" has its usual meaning. Examples of halogens include fluorine, chlorine, bromine, and iodine.

Molar selectivities are defined as:

$$\text{Benzene selectivity: } S_{Bz} = \frac{\dot{n}_{Bz,prod}}{\dot{n}_{conv\,C6,feed} - \dot{n}_{conv\,C6,prod}} \quad \text{Eq. 1}$$

$$\text{Toluene selectivity: } S_{Tol} = \frac{\dot{n}_{Tol,prod}}{\dot{n}_{conv\,C7,feed} - \dot{n}_{conv\,C7,prod}} \quad \text{Eq. 2}$$

$$\text{Benzene + Toluene selectivity: } S_{Bz+Tol} = \frac{\dot{n}_{Bz,prod} + \dot{n}_{Tol,prod}}{\dot{n}_{conv\,C6,C7,feed} - \dot{n}_{conv\,C6,C7,prod}} \quad \text{Eq. 3}$$

$$\text{Aromatics selectivity: } S_{arom} = \frac{\dot{n}_{Bz,prod} + \dot{n}_{Tol,prod} + \dot{n}_{C8+arom,prod}}{\dot{n}_{conv\,C6-C8+,feed} - \dot{n}_{conv\,C6-C8+arom,prod}} \quad \text{Eq. 4}$$

Conversion is defined as the number of moles converted per mol of "convertible" hydrocarbons fed:

$$C6 \text{ conversion: } X_{C6} = \frac{\dot{n}_{conv\,C6,feed} - \dot{n}_{conv\,C6,prod}}{\dot{n}_{conv\,C6,feed}} \quad \text{Eq. 5}$$

$$C7 \text{ conversion: } X_{C7} = \frac{\dot{n}_{conv\,C7,feed} - \dot{n}_{conv\,C7,prod}}{\dot{n}_{conv\,C7,feed}} \quad \text{Eq. 6}$$

$$C6 + C7 \text{ conversion: } X_{C6+C7} = \frac{\dot{n}_{conv\,C6,feed} + \dot{n}_{conv\,C7,feed} - \dot{n}_{conv\,C6,prod} - \dot{n}_{conv\,C7,prod}}{\dot{n}_{conv\,C6,feed} + \dot{n}_{conv\,C7,feed}} \quad \text{Eq. 7}$$

In these equations, n indicates a molar flow rate in a continuous reactor or the number of moles in a batch reactor.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which may be used in connection with the presently described invention.

DETAILED DESCRIPTION OF THE INVENTION

Disclosed herein are methods for producing supported catalysts in which the transition metal is impregnated onto the bound zeolite base using a mixture of water and an alcohol compound. Chlorine and fluorine can be co-impregnated along with the transition metal, or can be impregnated separately using water alone or a mixture of water and an alcohol compound.

The impregnation step is performed for a period of time sufficient to allow diffusion and deposition of the transition metal and halogen components into the pores of the bound zeolite base, subsequent to which the impregnated zeolite base is dried and calcined to form the supported catalyst.

Beneficially, as compared to traditional aromatization catalysts prepared using only water during impregnation, the supported catalysts described herein have unexpectedly improved catalyst activity and selectivity, and lower fouling rates, due to the use of the alcohol-water mixture during impregnation.

Methods for Producing Supported Catalysts

Various methods for producing supported catalysts, such as supported aromatization catalysts, are disclosed and described. One such method for producing a supported catalyst can comprise (or consist essentially of, or consist of) (a) impregnating a bound zeolite base with, in any order, a transition metal precursor in a solvent composition containing water and from about 5 wt. % to about 50 wt. % of a $C_1$ to $C_3$ alcohol compound, a chlorine precursor, and a fluorine precursor, to form an impregnated zeolite base, and (b) drying and then calcining the impregnated zeolite base to produce the supported catalyst. The supported catalyst can comprise, based on the total weight of the supported catalyst, from about 0.1 wt. % to about 10 wt. % of a transition metal, from about 0.1 wt. % to about 5 wt. % of chlorine, and from about 0.1 wt. % to about 5 wt. % of fluorine.

Generally, the features of any of the methods disclosed herein (e.g., the bound zeolite base, the alcohol compound, the amount of the alcohol compound, the transition metal precursor, the transition metal and transition metal content, the chlorine precursor, the chlorine content, the fluorine precursor, the fluorine content, the conditions under which the impregnation step is conducted, and the conditions under which the drying and calcining are conducted, among others) are independently described herein, and these features can be combined in any combination to further describe the disclosed methods. Moreover, other process steps can be conducted before, during, and/or after any of the steps listed in the disclosed methods, unless stated otherwise. Additionally, supported catalysts (such as supported aromatization catalysts) produced in accordance with any of the disclosed methods/processes are within the scope of this disclosure and are encompassed herein.

Referring now to step (a) of the method for producing a supported catalyst (often referred to as the impregnation step), the bound zeolite base can be impregnated with a transition metal precursor in a solvent composition, a chlorine precursor, and a fluorine precursor—in any order—to form an impregnated zeolite base. The bound zeolite base in step (a) can be produced by any technique known to those skilled in the art. For instance, the bound zeolite base—comprising a zeolite and a binder—can be produced by a process comprising mixing or combining a zeolite with a binder to form a mixture, then extruding the mixture to form an extrudate, followed by drying and calcining the extrudate to form a calcined base, and then washing, drying, and calcining the calcined base to form the bound zeolite base.

The transition metal precursor, chlorine precursor, and fluorine precursor in the impregnation step encompass any compounds that can deposit the transition metal, chlorine, and/or fluorine in or on the bound zeolite base, thereby forming the impregnated zeolite base. This description is meant to encompass (1) compounds that serve as a precursor for only one material—for example, ammonium chloride can be a chlorine precursor for chlorine—and (2) compounds that serve as a precursor for more than one material—for example, platinum(II) chloride can be both a transition metal precursor and a chlorine precursor for platinum and chlorine, while a chlorofluorocarbon compound can be both a chlorine precursor and a fluorine precursor for chlorine and fluorine.

Illustrative and non-limiting examples of transition metal precursors that are suitable for use in impregnating the bound zeolite base with platinum include, but are not limited to, tetraamineplatinum(II) chloride, tetraamineplatinum(II) nitrate, platinum(II) acetylacetonate, platinum(II) chloride, ammonium tetrachloroplatinate(II), chloroplatinic acid, platinum (II) nitrate, and the like, as well as mixtures or combinations thereof. Illustrative and non-limiting examples of chlorine precursors include hydrochloric acid, carbon tetrachloride, tetrachloroethylene, chlorobenzene, methyl chloride, methylene chloride, chloroform, allyl chloride, trichloroethylene, a chloramine, a chlorine oxide, a chlorine acid, chlorine dioxide, dichlorine monoxide, dichlorine heptoxide, chloric acid, perchloric acid, ammonium chloride, tetramethylammonium chloride, tetraethylammonium chloride, tetrapropylammonium chloride, tetrabutylammonium chloride, methyltriethylammonium chloride, and the like, as well as combinations thereof. Illustrative and non-limiting examples of fluorine precursors include hydrofluoric acid, 2,2,2-trifluoroethanol, tetrafluoroethylene, carbon tetrafluoride, carbon trifluoride, fluoromethane, heptafluoropropane, decafluorobutane, hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, ammonium fluoride, tetramethylammonium fluoride, tetraethylammonium fluoride, tetrapropylammonium fluoride, tetrabutylammonium fluoride, methyltriethylammonium fluoride, and the like, as well as combinations thereof.

Any suitable method or technique known to those of skill in the art that results in adequate dispersion of the transition metal on the supported catalyst can be used in the impregnation step. When only water is used as the carrier for the precursors, the method can involve mixing the bound zeolite base with any suitable transition metal precursor, where the transition metal precursor is present in an aqueous solution. Likewise, for the halogens, the impregnation step can comprise mixing the bound zeolite base with any suitable chlorine precursor and/or fluorine precursor, and in any order or sequence. For instance, the bound zeolite base can be mixed with a solution of the chlorine precursor, a solution of the fluorine precursor, or a solution of both the chlorine precursor and the fluorine precursor in water. An incipient wetness technique can be used.

Beneficially, in the disclosed methods, the bound zeolite base can be impregnated with—in any order—a transition metal precursor in a solvent composition containing water and from about 5 wt. % to about 50 wt. % of a $C_1$ to $C_3$ alcohol compound (instead of water alone), a chlorine precursor, and a fluorine precursor, to form the impregnated zeolite base. In one aspect, the bound zeolite base can be impregnated with the chlorine precursor and/or the fluorine precursor before the transition metal precursor. Any suitable carrier solvent can be used, such as water alone, or a mixture of water and an alcohol compound at any suitable blend ratio. Thus, the bound zeolite base can be impregnated with a solution containing water and the chlorine precursor and/or the fluorine precursor in one aspect, and the bound zeolite base can be impregnated with a solution containing water, an alcohol compound, and the chlorine precursor and/or the fluorine precursor in another aspect.

Herein, the bound zeolite base can be impregnated with the transition metal precursor in the solvent composition containing water and from about 5 wt. % to about 50 wt. % of the $C_1$ to $C_3$ alcohol compound, and the transition metal impregnation can occur prior to the halogen impregnation, after the halogen impregnation, or between the halogen impregnation (e.g., chlorine first, then transition metal, then fluorine). Alternatively, the bound zeolite base can be impregnated with the transition metal precursor and the chlorine precursor (or the transition metal precursor and fluorine precursor, or all of the transition metal precursor, the chlorine precursor, and the fluorine precursor) in the solvent composition containing water and from about 5 wt. % to about 50 wt. % of the $C_1$ to $C_3$ alcohol compound. Thus, for instance, the bound zeolite base can be mixed with a combination of the transition metal precursor, the chlorine precursor, and the fluorine precursor (i.e., all together), such as may be accomplished by mixing the bound zeolite base with the solvent composition comprising the transition metal precursor, the chlorine precursor, and the fluorine precursor, in which the solvent composition contains water and from about 5 wt. % to about 50 wt. % of the $C_1$ to $C_3$ alcohol compound.

Any suitable amount of the alcohol compound can be used in the solvent composition, and this can vary based on which precursor compounds are used, solubility considerations, and the desired aromatization catalyst performance, amongst other factors. Generally, however, the solvent composition contains from about 5 wt. % to about 50 wt. % of the alcohol compound, and illustrative and non-limiting ranges can include from about 5 wt. % to about 45 wt. %, from about 10 wt. % to about 40 wt. %, from about 10 wt. % to about 35 wt. %, from about 10 wt. % to about 30 wt. %, from about 15 wt. % to about 50 wt. %, or from about 15 wt. % to about 35 wt. %, of the alcohol compound.

The solvent composition can contain any $C_1$ to $C_3$ alcohol compound, whether singly or in combination. The alcohol compound can comprise methanol, ethanol, n-propanol, isopropanol, or any combination thereof, and therefore, the solvent composition can contain methanol; alternatively, ethanol; alternatively, n-propanol; alternatively, isopropanol; alternatively, methanol and ethanol; or alternatively, n-propanol and isopropanol; and so forth.

Referring now to step (b), the impregnated zeolite base can be dried and then calcined to produce the supported catalyst. Any suitable temperatures, pressures, time periods, and atmospheres can be used in the drying and calcining steps.

In one aspect, the drying step can comprise contacting the impregnated zeolite base with a drying gas stream comprising (or consisting essentially, or consisting of) an inert gas (e.g., nitrogen), oxygen, air, or any mixture or combination thereof; alternatively, nitrogen; alternatively, helium; alternatively, neon; alternatively, argon; alternatively, oxygen; or alternatively, air. While not being limited thereto, the drying step generally can be conducted at a drying temperature in a range from about 30° C. to about 200° C.; alternatively, from about 100° C. to about 200° C.; alternatively, from about 85° C. to about 175° C.; or alternatively, from about 30° C. to about 100° C. In these and other aspects, these temperature ranges also are meant to encompass circumstances where the drying step is conducted at a series of different temperatures, instead of at a single fixed temperature, falling within the respective ranges. In some aspects, the drying step can be performed at atmospheric pressure, or at any suitable sub-atmospheric pressure, such as less than about 150 Torr, less than about 125 Torr, less than about 100 Torr, or less than about 50 Torr.

The duration of the drying step is not limited to any particular period of time. Typically, the drying step can be conducted in a time period ranging from as little as 30 minutes to as long as 8 hr (or more), but more typically, the drying step can be conducted in a time period that can be in a range from about 1 hr to about 8 hr, such as, for example, from about 1 hr to about 7 hr, from about 1 hr to about 6 hr, from about 2 hr to about 7 hr, or from about 2 hr to about 6 hr.

The calcining step can be conducted at a variety of temperatures and time periods. Typical peak calcining temperatures often fall within a range from about 200° C. to about 600° C., such as from about 200° C. to about 500° C., from about 230° C. to about 450° C., or from about 230° C. to about 350° C. In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges. For instance, the calcination step can start at an initial temperature which is the same as the drying temperature in the drying step. Subsequently, the temperature of the calcination can be increased over time to a peak calcining temperature, for example, in a range from about 230° C. to about 350° C., from about 275° C. to about 425° C., or from about 300° C. to about 400° C.

The duration of the calcining step is not limited to any particular period of time. Hence, the calcining step can be conducted, for example, in a time period ranging from as little as 30-45 minutes to as long as 10-12 hr, or more. The appropriate calcining time can depend upon, for example, the initial/peak calcining temperature and the conditions of the drying step, among other variables. Generally, however, the calcining step can be conducted in a time period that can be in a range from about 45 min to about 12 hr, such as, for example, from about 1 hr to about 12 hr, from about 1 hr to about 10 hr, from about 1 hr to about 5 hr, or from about 1 hr to about 3 hr.

The calcining step can be conducted in a calcining gas stream that comprises (or consists essentially of, or consists of) an inert gas (e.g., nitrogen), oxygen, air, or any mixture or combination thereof. In some aspects, the calcining gas stream can comprise air, while in other aspects, the calcining gas stream can comprise a mixture of air and nitrogen. Yet, in certain aspects, the calcining gas stream can be an inert gas, such as nitrogen and/or argon.

The methods for preparing a supported catalyst disclosed herein can further comprise a reducing step after step (b), i.e., after drying and calcining the impregnated zeolite base to produce the supported catalyst. This reducing step can comprise contacting the supported catalyst with a reducing gas stream comprising hydrogen to produce a reduced (or activated) supported catalyst. Often, the reducing gas stream comprises molecular hydrogen, either alone or with an inert gas, such as helium, neon, argon, nitrogen, and the like, and this includes combinations of two or more of these inert gasses. In certain aspects, the reducing gas stream can comprise (or consist essentially of, or consist of) molecular hydrogen and nitrogen. Moreover, molecular hydrogen can be the major component of the reducing gas stream (greater than 50 mol %), while in other aspects, molecular hydrogen can be a minor component (between 5-35 mol %, or between 1-6 mol %). In another aspect, the reducing gas stream can comprise (or consist essentially of, or consist of) molecular hydrogen and hydrocarbons.

The reducing step can be conducted at a variety of temperatures and time periods. For instance, the reducing step can be conducted at a reducing temperature in a range from about 100° C. to about 700° C.; alternatively, from about 200° C. to about 600° C.; alternatively, from about 200° C. to about 575° C.; alternatively, from about 350° C. to about 575° C.; alternatively, from about 400° C. to about 550° C.; or alternatively, from about 450° C. to about 550° C. In these and other aspects, these temperature ranges also are meant to encompass circumstances where the reducing step is conducted at a series of different temperatures, instead of at a single fixed temperature, falling within the respective ranges.

The duration of the reducing step is not limited to any particular period of time. Hence, the reducing step can be conducted, for example, in a time period ranging from as little as 1 hr to as long as 48-72 hr, or more. For example, the reducing step can be conducted in a time period that can be in a range from about 1 hr to about 48 hr, from about 3 hr to about 36 hr, from about 5 hr to about 36 hr, from about 2 hr to about 30 hr, or from about 10 hr to about 30 hr.

In one aspect, the reducing step can be performed ex-situ. In this aspect, the supported catalyst is converted to a reduced (or activated) supported catalyst according to the procedures described above. This reduction can occur at the catalyst manufacturing site or another site. The reduced (or activated) supported catalyst then can be packaged under air or under an inert gas and is then stored prior to being loaded into the aromatization reactor and used in the aromatization reactor system. Prior to use, a reduction step can be performed to reduce any supported catalyst that became oxidized after the first reduction, for example during storage, transport and loading. This second reduction can require the same or less time than the in-situ reduction described below.

In another aspect, the reducing step can be performed in-situ. In this aspect, the supported catalyst is packaged after the calcining step. The supported catalyst can be stored for an extended period of time prior to loading into the aromatization reactor. After loading, the supported catalyst is then converted to a reduced (or activated) supported catalyst according to the procedures described above.

It is contemplated that non-alcohol compounds (e.g., ketones) can be present in the solvent composition, either with water and the alcohol compound, or with water and in place of the alcohol compound. For instance, certain ketone compounds may have properties similar to that of $C_1$ to $C_3$ alcohol compounds, and thus could be utilized in solvent compositions to prepare the supported catalysts as disclosed herein. Suitable ketone compounds can be selected based on miscibility with water and based on volatility. Non-limiting examples can include butanone (methyl ethyl ketone, MEK), pentanone, hexanone, and the like. Thus, another method of producing a supported catalyst consistent with this disclosure can comprise (a) impregnating a bound zeolite base with, in any order, a transition metal precursor in a solvent composition containing water and from about 5 wt. % to about 50 wt. % of a ketone compound, a chlorine precursor, and a fluorine precursor, to form an impregnated zeolite base, and (b) drying and then calcining the impregnated zeolite base to produce the supported catalyst. The supported catalyst comprises, based on the total weight of the supported catalyst, from about 0.1 wt. % to about 10 wt. % of a transition metal, from about 0.1 wt. % to about 5 wt. % of chlorine, and from about 0.1 wt. % to about 5 wt. % of fluorine.

Supported Catalysts

Consistent with aspects disclosed herein are supported catalysts comprising (or consisting essentially of, or consisting of) a bound zeolite base, from about 0.1 wt. % to about 10 wt. % of a transition metal, from about 0.1 wt. % to about 5 wt. % of chlorine, and from about 0.1 wt. % to about 5 wt. % of fluorine. These weight percentages are based on the total weight of the supported catalyst.

Referring first to the bound zeolite base, any suitable bound zeolite base can be used in the methods to produce the supported catalysts described herein. Typically, the bound zeolite base can comprise an inorganic oxide, examples of which can include, but are not limited to, bound medium and/or large pore zeolites (aluminosilicates), amorphous inorganic oxides, as well as mixtures thereof. Large pore zeolites often have average pore diameters in a range of from about 7 Å to about 12 Å, and non-limiting examples of large pore zeolites include L-zeolite, Y-zeolite, mordenite, omega zeolite, beta zeolite, and the like. Medium pore zeolites often have average pore diameters in a range of from about 5 Å to about 7 Å. Amorphous inorganic oxides can include, but are not limited to, aluminum oxide, silicon oxide, titania, and combinations thereof.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms can be equal to 2. The framework exhibits a negative electrovalence that typically can be balanced by the inclusion of cations within the crystal, such as metals, alkali metals, and/or hydrogen.

In some aspects, the bound zeolite base can comprise an L-type zeolite. L-type zeolite supports are a sub-group of zeolitic supports, which can contain mole ratios of oxides in accordance with the formula: $M_{2/n}OAl_2O_3xSiO_2yH_2O$. In this formula, "M" designates an exchangeable cation (one or more) such as barium, calcium, cerium, lithium, magnesium, potassium, sodium, strontium, and/or zinc, as well as non-metallic cations like hydronium and ammonium ions, which can be replaced by other exchangeable cations without causing a substantial alteration of the basic crystal structure of the L-type zeolite. The "n" in the formula represents the valence of "M"; "x" is 2 or greater; and "y" is the number of water molecules contained in the channels or interconnected voids of the zeolite.

In one aspect, the bound zeolite base can comprise a bound potassium L-type zeolite, also referred to as a K/L-zeolite, while in another aspect, the bound zeolite base can comprise a barium ion-exchanged L-zeolite. As used herein, the term "K/L-zeolite" refers to L-type zeolites in which the principal cation M incorporated in the zeolite is potassium. A K/L-zeolite can be cation-exchanged (e.g., with barium) to form an exchanged zeolite (e.g., a Ba/L-zeolite) prior to being formed into a bound zeolite base. A bound zeolite base comprising a L-zeolite can be impregnated with a transition metal and one or more halides to produce a transition metal impregnated, halided zeolite or a K/L supported transition metal-halide zeolite catalyst.

In the bound zeolite base, the zeolite can be bound with a support matrix (or binder), and non-limiting examples of binders can include, but are not limited to, inorganic solid oxides, clays, and the like, as well as combinations thereof. The zeolite can be bound with the binder or support matrix using any method known in the art. For instance, the bound zeolite base—comprising a zeolite and a binder—can be produced by a process comprising mixing a zeolite, such as a K/L-zeolite, with a binder, such as a silica sol, then extruding the mixture to form an extrudate, followed by drying and calcining the extrudate to form a calcined base, and then washing, drying, and calcining the calcined base to form the bound zeolite base.

In some aspects, the binder can comprise alumina, silica, magnesia, boria, titania, zirconia, or a mixed oxide thereof (e.g., an aluminosilicate), or a mixture thereof, while in other aspects, the binder can comprise a montmorillonite, a kaolin, a cement, or a combination thereof. In a particular aspect contemplated herein, the binder can comprise silica, alumina, or a mixed oxide thereof; alternatively, silica; alternatively, alumina; or alternatively, silica-alumina. Accordingly, the bound zeolite base can comprise a silica-bound L-zeolite, such as a silica-bound Ba/L-zeolite, a silica-bound barium ion-exchanged L-zeolite, or a silica-bound K/L-zeolite.

While not being limited thereto, bound zeolite bases (or the supported catalysts) encompassed herein can comprise from about 3 wt. % to about 35 wt. % binder. For example, the bound zeolite base (or the supported catalyst) can comprise from about 5 wt. % to about 30 wt. %, or from about 10 wt. % to about 30 wt. % binder. These weight percentages are based on the total weight of the bound zeolite base, or based on the total weight of the supported catalyst, as the context requires.

Illustrative examples of bound zeolite bases and their use in supported catalysts are described in U.S. Pat. Nos. 5,196,631, 6,190,539, 6,406,614, 6,518,470, 6,812,180, and 7,153,801, the disclosures of which are incorporated herein by reference in their entirety.

The supported catalyst can comprise from about 0.25 wt. % to about 5 wt. % of a transition metal. For example, the supported catalyst can comprise from about 0.5 wt. % to about 3 wt. %, from about 0.5 wt. % to about 2 wt. %, or from about 0.7 wt. % to about 1.5 wt. % transition metal. These weight percentages are based on the total weight of the supported catalyst.

Non-limiting examples of suitable transition metals can include iron, cobalt, nickel, ruthenium, rhodium, palladium, osmium, iridium, platinum, gold, silver, copper, and the like, or a combination of two or more transition metals. In one aspect, the transition metal can comprise a Group 8-11 transition metal or a Group 8-10 transition metal (one or more), while in another aspect, the transition metal can comprise platinum (Pt). In yet another aspect, the bound zeolite base is impregnated with only one transition metal, and the transition metal is platinum.

In circumstances where the transition metal comprises platinum, the supported catalyst can comprise from about 0.1 wt. % to about 10 wt. % platinum; alternatively, from about 0.25 wt. % to about 5 wt. % platinum; alternatively, from about 0.5 wt. % to about 3 wt. % platinum; or alternatively, from about 0.7 wt. % to about 1.5 wt. % platinum. In a particular aspect contemplated herein, the supported catalyst can comprise platinum on a bound K/L-zeolite.

The supported catalysts described herein can have any suitable loading of chlorine (Cl), typically ranging from about 0.1 wt. % to about 5 wt. %, based on the total weight of the supported catalyst. In one aspect, the supported catalyst can comprise from about 0.3 wt. % to about 4 wt. % chlorine, or from about 0.4 wt. % to about 3.5 wt. % chlorine. In another aspect, the supported catalyst can comprise from about 0.5 wt. % to about 3.3 wt. % chlorine. In yet another aspect, the supported catalyst can comprise from about 0.5 wt. % to about 1.5 wt. % chlorine. In still another aspect, the supported catalyst can comprise from about 1.8 wt. % to about 3.2 wt. % chlorine, or from about 2 wt. % to about 3 wt. % chlorine. High loadings of chlorine in the supported catalyst may provide improved catalyst activity and stability, and lower fouling rates.

The supported catalyst also comprises fluorine (F), which often ranges from about 0.1 wt. % to about 5 wt. %, or from about 0.3 wt. % to about 4 wt. %, based on the total weight of the supported catalyst. For instance, the supported catalyst can comprise from about 0.4 wt. % to about 3 wt. % fluorine, from about 0.3 wt. % to about 2 wt. % fluorine, or from about 0.4 wt. % to about 1.5 wt. % fluorine.

While not being limited thereto, the supported catalyst can be characterized by a weight ratio of chlorine:fluorine that often falls within a range from about 1:5 to about 8:1, or from about 1:5 to about 5:1. In some aspects, the weight ratio of chlorine:fluorine can range from about 1:3 to about 3:1, while in other aspects, the weight ratio can range from about 1:2 to about 2:1.

Likewise, while not being limited thereto, the supported catalyst can be characterized by a BET surface area that generally ranges from about 100 m$^2$/g to about 300 m$^2$/g, such as from about 100 m$^2$/g to about 200 m$^2$/g, or from about 110 m$^2$/g to about 170 m$^2$/g. Surface areas are determined using the Brunauer, Emmett, and Teller ("BET") method, described in Brunauer, Stephen; Emmett, P. H.; Teller, Edward (1938), "Adsorption of Gases in Multimolecular Layers," Journal of the American Chemical Society, 60 (2): 309-319, doi:10.1021/ja01269a023, which is incorporated herein by reference in its entirety.

The platinum dispersion of the supported catalysts produced by the methods disclosed herein often can range from about 40% to about 80%. In one aspect, for example, the platinum dispersion can be in a range from about 50% to about 80%, while in another aspect, the platinum dispersion can be in a range from about 60% to about 80%, and in yet another aspect, the platinum dispersion can be in a range from about 60% to about 75%.

While the supported catalysts produced by the methods disclosed herein can have improved activity, improved selectivity, and lower fouling rates, these supported catalysts—unexpectedly—can have platinum dispersions that are substantially the same as that of otherwise identical catalysts prepared under the same catalyst preparation conditions without the alcohol compound. In these circumstances, "substantially" the same means within +/−5% platinum dispersion, and more typically, within +/−3%, or within +/−1% platinum dispersion.

Importantly, the performance of the supported catalysts disclosed herein in aromatization reactions is improved. Surprisingly, these supported catalysts have higher catalyst activity and stability, as quantified by the $T_{SOR}$ (start of run temperature), $T_{EOR}$ (end of run temperature), and FR (fouling rate) metrics discussed in greater detail in the examples that follow. Generally, the supported catalysts described herein can have a lower 40-hr $T_{SOR}$, a lower 40-hr $T_{EOR}$, and/or a lower 40-hr FR than that of an otherwise identical catalyst prepared under the same catalyst preparation conditions without the alcohol compound, and evaluated under the same 40-hr aromatization reaction conditions. Thus, the comparison is for supported catalysts having the same platinum, fluorine, chlorine, and other compositional attributes, and prepared in the same manner (other than the use of the alcohol compound in the impregnation step), and tested under the same 40-hr aromatization reaction conditions (see Examples 1-2 below).

The supported catalysts of this invention can be characterized by a 40-hr $T_{SOR}$ (start of run temperature), as described herein, which often can fall within a range from about 910° F. (488° C.) to about 925° F. (496° C.), or from about 910° F. (488° C.) to about 920° F. (493° C.). Additionally or alternatively, these supported catalysts can be characterized by a 40-hr $T_{EOR}$ (end of run temperature), as described herein, which often can fall within a range from about 910° F. (488° C.) to about 930° F. (499° C.), or from about 910° F. (488° C.) to about 925° F. (496° C.).

Likewise, these supported catalysts can be characterized by a 40-hr aromatics selectivity (or a 40-hr benzene+toluene selectivity) of at least about 92 mol %, and in some instance, at least about 93 mol %, or at least about 94 mol %. Additionally or alternatively, the supported catalysts of this invention can have a 40-hr aromatics selectivity (or a 40-hr benzene+toluene selectivity) that is substantially the same as or greater than that of an otherwise identical catalyst prepared under the same catalyst preparation conditions without the alcohol compound, and evaluated under the same 40-hr aromatization reaction conditions. In these circumstances, "substantially" the same means within +/−1 mol %, and more typically, within +/−0.5 mol %.

Under test conditions longer than 40 hr, the supported catalysts disclosed herein also demonstrate improved catalytic performance, as discussed in greater detail in the examples that follow. Generally, these supported catalysts described herein can have a lower 600-hr $T_{SOR}$, a lower 600-hr $T_{EOR}$, a lower 600-hr FR, and/or a higher 600-hr $H_2/CH_4$ yield than that of an otherwise identical catalyst prepared under the same catalyst preparation conditions without the alcohol compound, and evaluated under the same 600-hr aromatization reaction conditions. Thus, the comparison is for supported catalysts having the same platinum, fluorine, chlorine, and other compositional attributes, and prepared in the same manner (other than the use of the alcohol compound in the impregnation step), and tested under the same 600-hr aromatization reaction conditions (see Example 7 below).

These supported catalysts can be characterized by a 600-hr $T_{SOR}$ (start of run temperature), as described herein, which often can fall within a range from about 930° F. (499° C.) to about 960° F. (516° C.), or from about 940° F. (504° C.) to about 955° F. (513° C.). Additionally or alternatively, these supported catalysts can be characterized by a 600-hr $T_{EOR}$ (end of run temperature), as described herein, which often can fall within a range from about 930° F. (499° C.) to about 975° F. (524° C.), or from about 940° F. (504° C.) to about 965° F. (518° C.). Additionally or alternatively, these supported catalysts can be characterized by a 600-hr FR (fouling rate), as described herein, which often can be less than about 0.02° F./hr (0.01° C./hr), or less than about 0.01° F./hr (0.006° C./hr). Additionally or alternatively, these supported catalysts can be characterized by a 600-hr $H_2/CH_4$ yield that can fall within a range from about 30 to about 47%, or from about 35 to about 45%.

Under test conditions longer than 600 hr, the supported catalysts disclosed herein also demonstrate improved catalytic performance, as discussed in greater detail in the examples that follow. Generally, these supported catalysts described herein can have a lower 2500-hr $T_{SOR}$, a lower 2500-hr $T_{EOR}$, and/or a higher 2500-hr aromatics selectivity (or 2500-hr benzene+toluene selectivity) than that of an otherwise identical catalyst prepared under the same catalyst preparation conditions without the alcohol compound, and evaluated under the same 2500-hr aromatization reaction conditions. Thus, the comparison is for supported catalysts having the same platinum, fluorine, chlorine, and other compositional attributes, and prepared in the same manner (other than the use of the alcohol compound in the impregnation step), and tested under the same 2500-hr aromatization reaction conditions (see Example 8 below).

Reforming Processes with Aromatization Catalysts

Also encompassed herein are various processes for reforming hydrocarbons. One such reforming process can comprise (or consist essentially of, or consist of) contacting a hydrocarbon feed with a supported aromatization catalyst under reforming conditions in a reactor system to produce an aromatic product. The supported aromatization catalyst used in the reforming process can be any supported catalyst disclosed herein (e.g., reduced or activated catalyst) and/or can be produced by any method for producing a supported catalyst disclosed herein.

The reactor systems for reforming and the respective reforming conditions are well known to those of skill in the art and are described, for example, in U.S. Pat. Nos. 4,456,527, 5,389,235, 5,401,386, 5,401,365, 6,207,042, and 7,932,425, the disclosures of which are incorporated herein by reference in their entirety.

Likewise, typical hydrocarbon feeds are disclosed in these references. Often, the hydrocarbon feed can be a naphtha stream or light naphtha stream. In certain aspects, the hydrocarbon feed can comprise non-aromatic hydrocarbons, for example, the hydrocarbon feed can comprise $C_6$-$C_9$ alkanes and/or cycloalkanes, or $C_6$-$C_8$ alkanes and/or cycloalkanes (e.g., hexane, heptane, cyclohexane), and the like.

Typically, the hydrocarbon feed may be substantially free of sulfur, nitrogen, metals, and other known poisons for reforming catalysts. If present, such poisons can be removed using methods known to those skilled in the art. In some aspects, the feed can be purified by first using conventional hydrofining techniques, then using sorbents to remove the remaining poisons, as is known to those of skill in the art. Such hydrofining techniques and sorbents may be part of the improved catalytic reforming process described herein.

As described herein, and unexpectedly, the supported catalysts can have improved catalyst activity and stability, and reduced fouling rates in aromatization or reforming reactions, as compared to otherwise identical catalysts produced without the use of an alcohol compound during the impregnation step.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Weight percentages of Pt, Cl, and F were determined using X-ray fluorescence (XRF), and are based on the total weight of the aromatization catalyst, unless stated otherwise. Platinum dispersions were determined by CO Chemisorption.

Supported catalysts were tested for their performance in aromatization reactions using the following general procedure, unless noted otherwise. The supported aromatization catalysts were ground and sieved to about 20-40 mesh (US), and 2 cc of the sieved supported catalyst was placed in a ⅜-inch OD stainless steel reactor vessel in a temperature-controlled furnace. After reducing the supported catalyst under flowing molecular hydrogen, a feed stream of aliphatic hydrocarbons and molecular hydrogen was introduced to the reactor vessel at a pressure of 65 psig, a hydrogen:hydrocarbon molar ratio of 2:1, and a liquid hourly space velocity (LHSV) of 6 hr$^{-1}$. The aliphatic hydrocarbon feed contained approximately 0.61 mole fraction of convertible $C_6$ species and 0.21 mole fraction of convertible $C_7$ species. The balance was aromatics, $C_8+$, and non-convertible hydrocarbon. The reactor temperature was then adjusted to maintain a target of 75 or 83.5 wt. % aromatics in the $C_5^+$ fraction of the reactor effluent as determined by gas chromatography. The amounts of the numerous feedstock components and product components, including benzene and toluene present, also were recorded for selectivity calculations.

The temperature at the start of run ($T_{SOR}$) and the fouling rate (abbreviated FR, units of ° F./hr) of a supported catalyst sample were determined by plotting the temperature (yield adjusted catalyst temperature) required to maintain a total yield of aromatics (such as benzene and toluene) at 75 or 83.5 wt. % over time at the standard test conditions provided above. As used herein, the term "yield-adjusted temperature" refers to the catalyst bed temperature in a lab-scale reactor system which has been adjusted to account for samples taken when the reactor effluent does not contain 75 or 83.5 wt. % aromatics in the $C_5^+$ fraction of the reactor effluent. The adjustment factor (for example, in units of ° F./wt. %) was determined by prior experiments with similar supported catalysts. A linear regression analysis of the temperatures collected between 15 and 40 hr results in the formula, $T_{adj}=FR*t+T_{SOR}$, where $T_{adj}$ is the yield adjusted temperature, FR is the fouling rate, t is time, and $T_{SOR}$ is the Start of Run temperature (temperature needed to achieve 75 or 83.5 wt. % aromatics yield at a hypothetical time zero). The total time on stream was 40 hr, and the End of Run temperature (abbreviated $T_{EOR}$) at 40 hr also was determined; $T_{EOR}$ is the temperature needed to achieve 75 or 83.5 wt. % aromatics yield at the end of the 40-hr run. Initial low conversion and catalyst break-in conditions were the primary reasons that the temperatures prior to 15 hr were not included in the determination of $T_{SOR}$ and FR.

A standard bound K/L-zeolite base consisting of approximately 17 wt. % silica binder was used as the starting material in all examples. The reference supported catalyst was produced by impregnating the bound zeolite base with approximately 1 wt. % Pt, 0.85 wt. % Cl, and 0.6 wt. % F via incipient wetness techniques by contacting the bound zeolite base with an aqueous solution (water with no alcohol compound present) containing platinum tetraammonium chloride ($Pt(NH_3)_4Cl_2.xH_2O$), ammonium chloride, and ammonium fluoride. Then, the impregnated base was dried at 95° C., and calcined at 575° F. (302° C.) to form the supported catalyst.

Example 1

In Example 1, a supported catalyst was prepared with a solvent composition containing 70 wt. % water and 30 wt. % ethanol. The Pt, Cl and F precursors were solubilized in a 70 wt. % water and 30 wt. % ethanol solution, and the bound K/L-zeolite base was impregnated with the 70 wt. % water and 30 wt. % ethanol solution containing the Pt, Cl and F precursors (instead of 100% water for the reference supported catalyst). For both catalysts, the K/L-zeolite base preparation, the incipient wetness technique, the drying procedure, and calcination conditions were the same. After reduction/activation in hydrogen, the catalysts were compared using the 40-hr test procedure described above.

Figure 2:
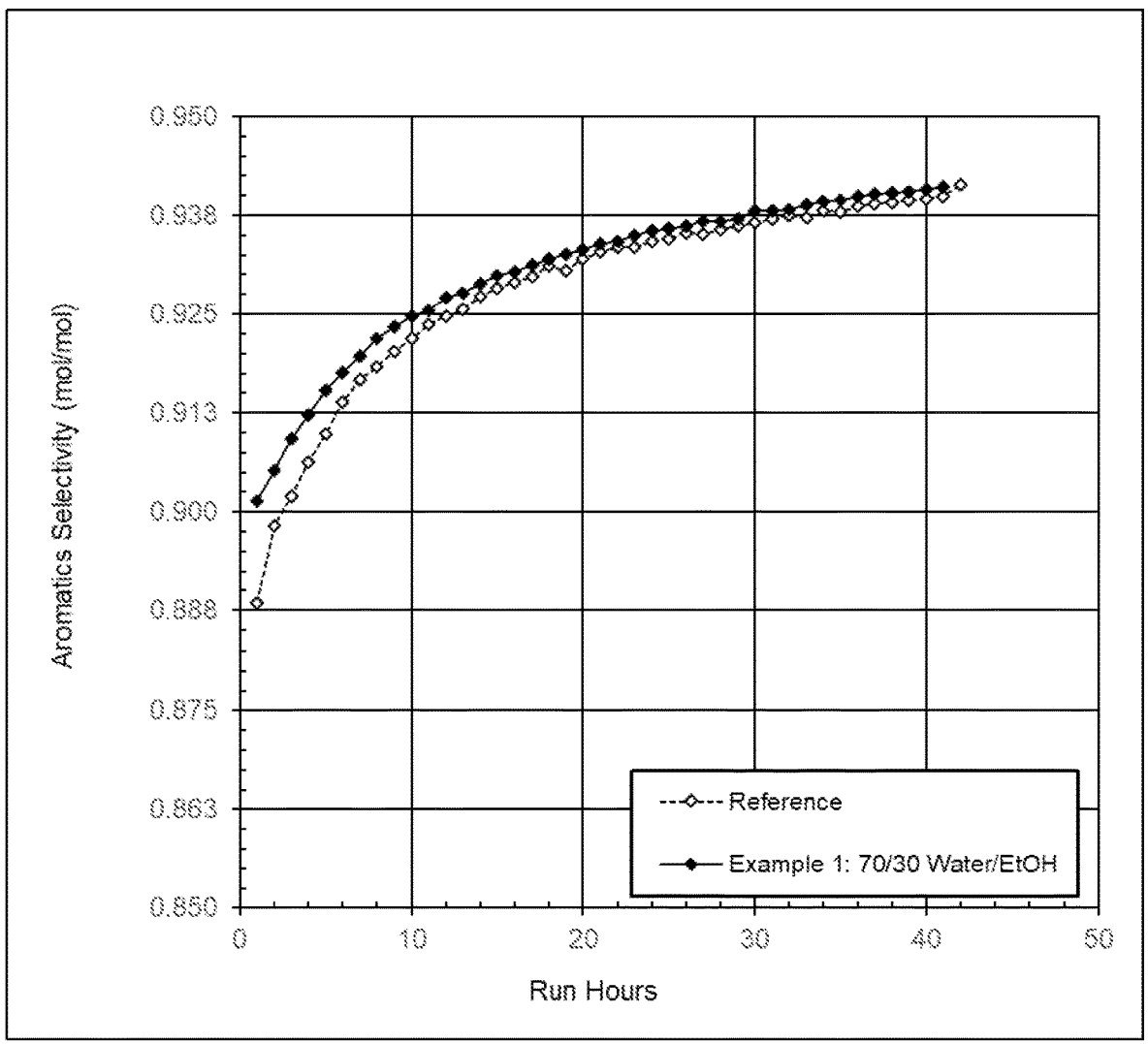
FIG. 2 presents a plot of the molar aromatics selectivity versus reaction time for the supported catalysts of Example 1.

FIG. 1 compares the yield-adjusted temperature versus reaction time for each supported catalyst, and illustrates the higher activity of the catalyst prepared using ethanol as compared to the reference catalyst. Unexpectedly, the target aromatics yield of 83.5 wt. % was achieved at an approximate 8-10° F. (4-6° C.) lower reaction temperature for the catalyst prepared using the water/ethanol solution. In this 40-hr test, the molar selectivity to aromatics was comparable to slightly better for the catalyst prepared using the water/ethanol solution, as shown in FIG. 2.

Example 2

Figure 3:
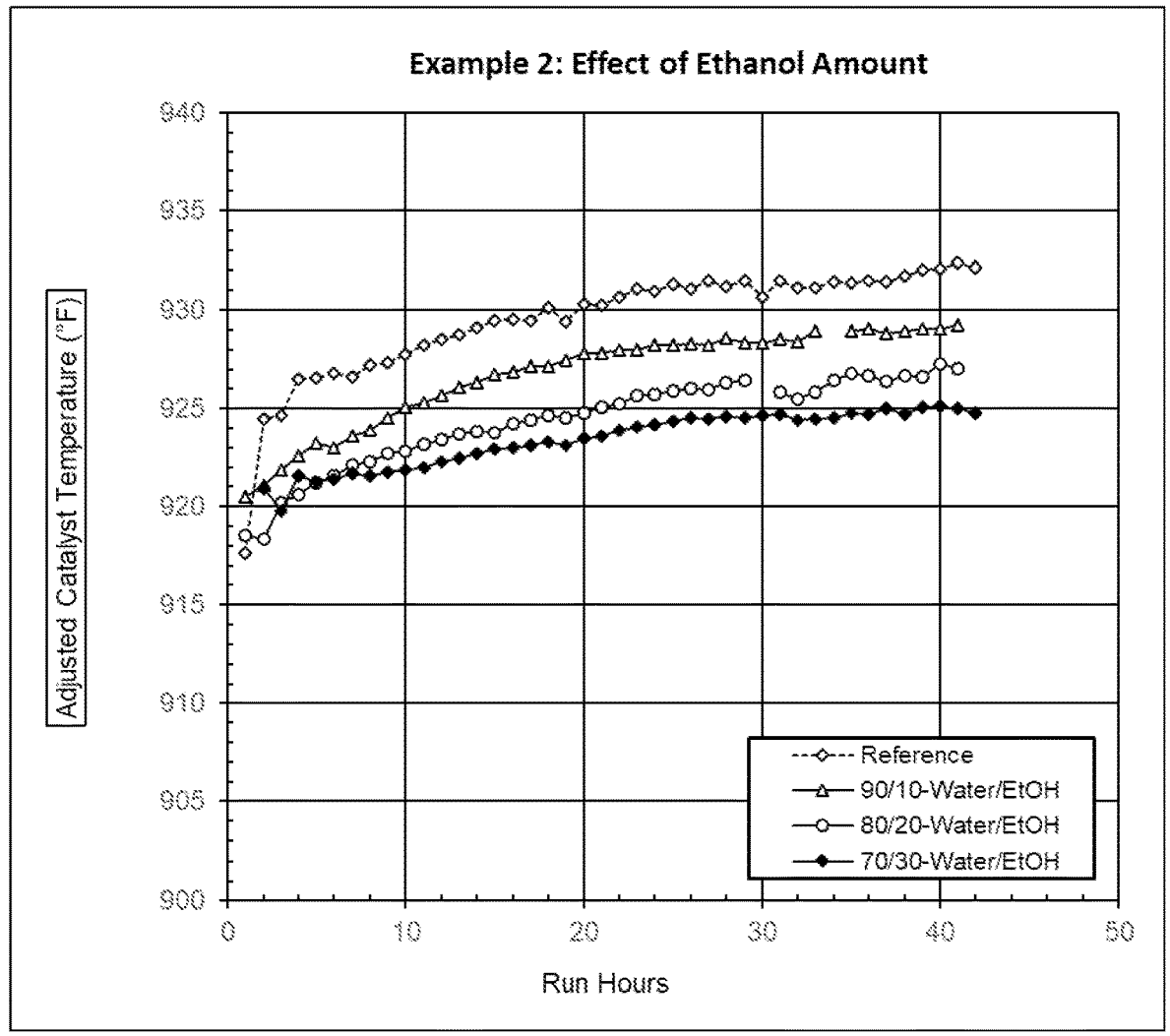
FIG. 3 presents a plot of the yield-adjusted temperature versus reaction time for the supported catalysts of Example 2.
Figure 4:
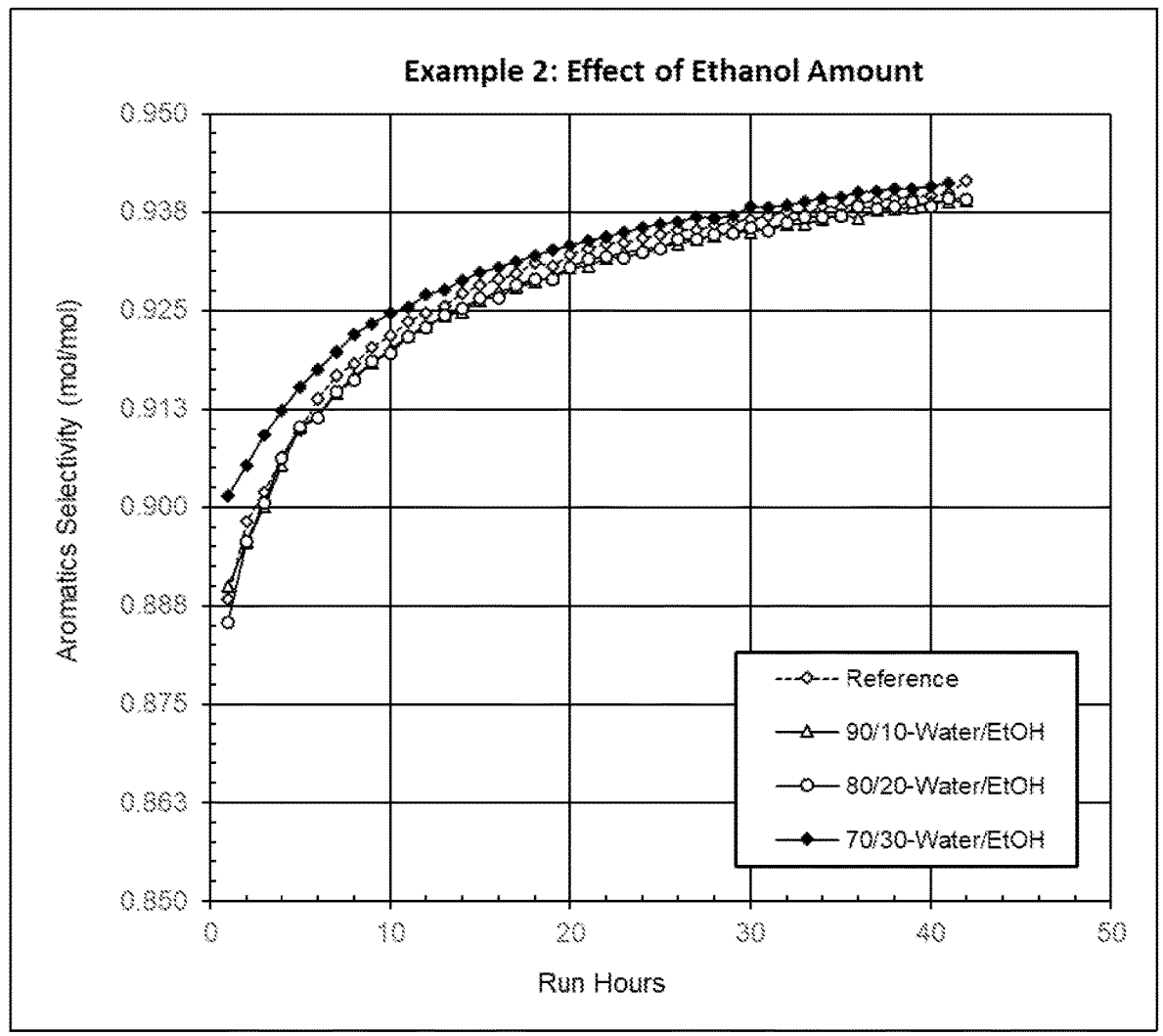
FIG. 4 presents a plot of the molar aromatics selectivity versus reaction time for the supported catalysts of Example 2.

In Example 2, supported catalysts were produced as described in Example 1, except that catalysts were prepared with no ethanol (reference), 10 wt. % ethanol, 20 wt. % ethanol, or 30 wt. % ethanol. Using the 40-hr test procedure described above, the activity (83.5 wt. aromatics yield) and selectivity to aromatics were determined for each catalyst. FIGS. 3-4 summarize the results.

Beneficially, all levels of ethanol (from 10 to 30 wt. %) improved the catalyst activity with comparable selectivity performance. As the amount of ethanol was increased, the catalyst activity increased accordingly. However, for these supported catalysts and precursors, the maximum amount of ethanol was limited by the solubility of precursors to approximately 30 wt. % ethanol.

Example 3

Figure 5:
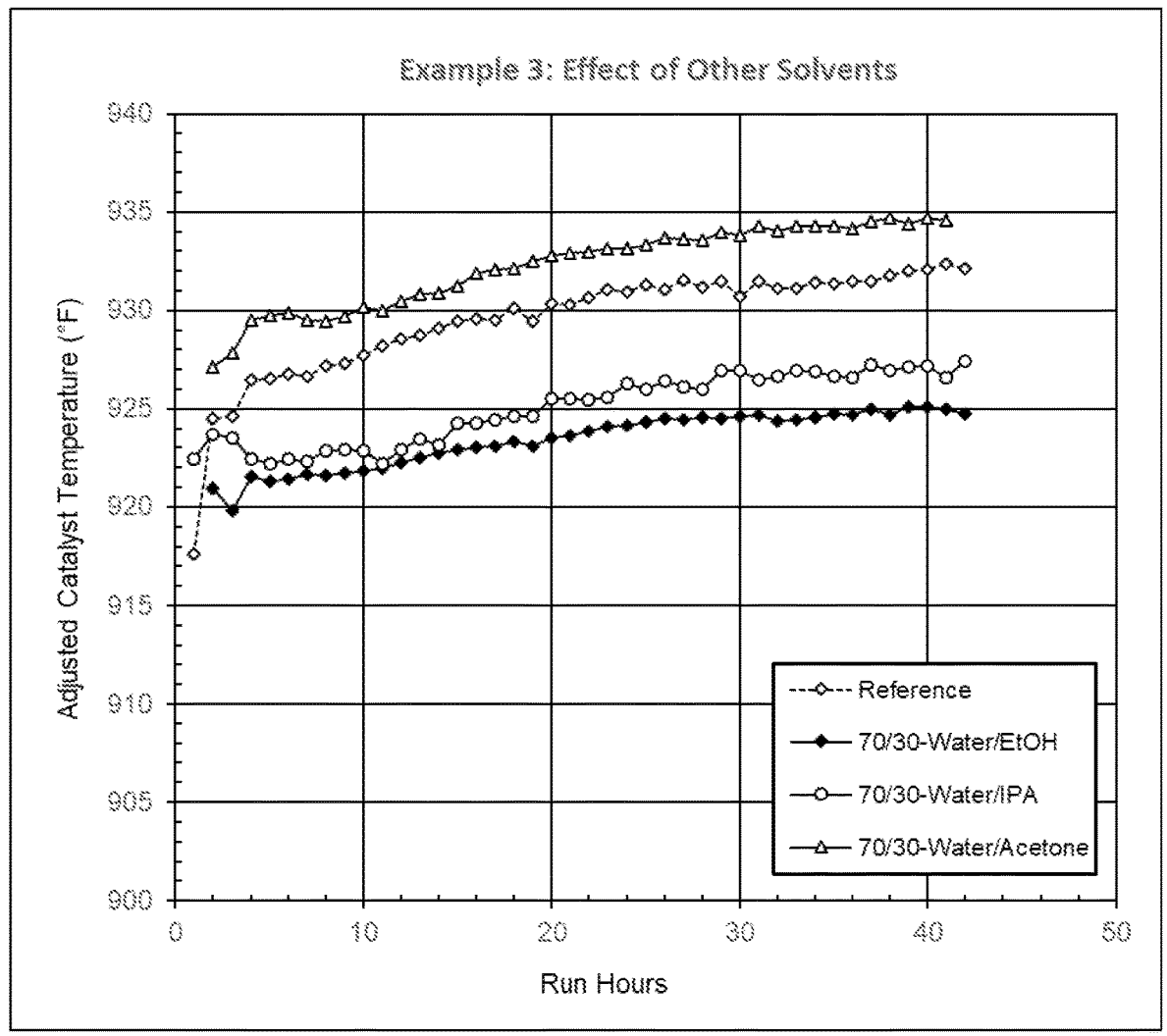
FIG. 5 presents a plot of the yield-adjusted temperature versus reaction time for the supported catalysts of Example 3.
Figure 6:
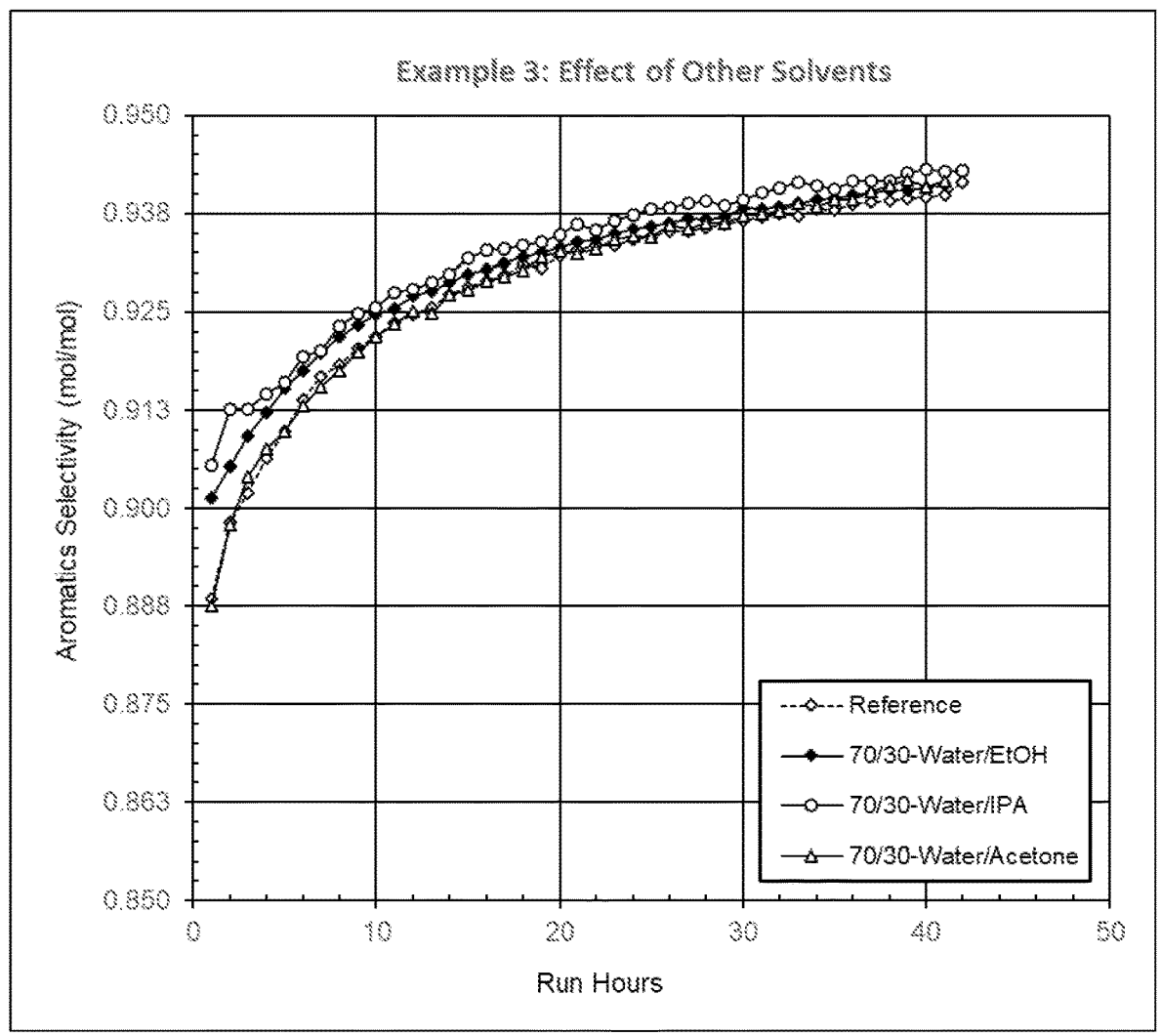
FIG. 6 presents a plot of the molar aromatics selectivity versus reaction time for the supported catalysts of Example 3.
Figure 7:
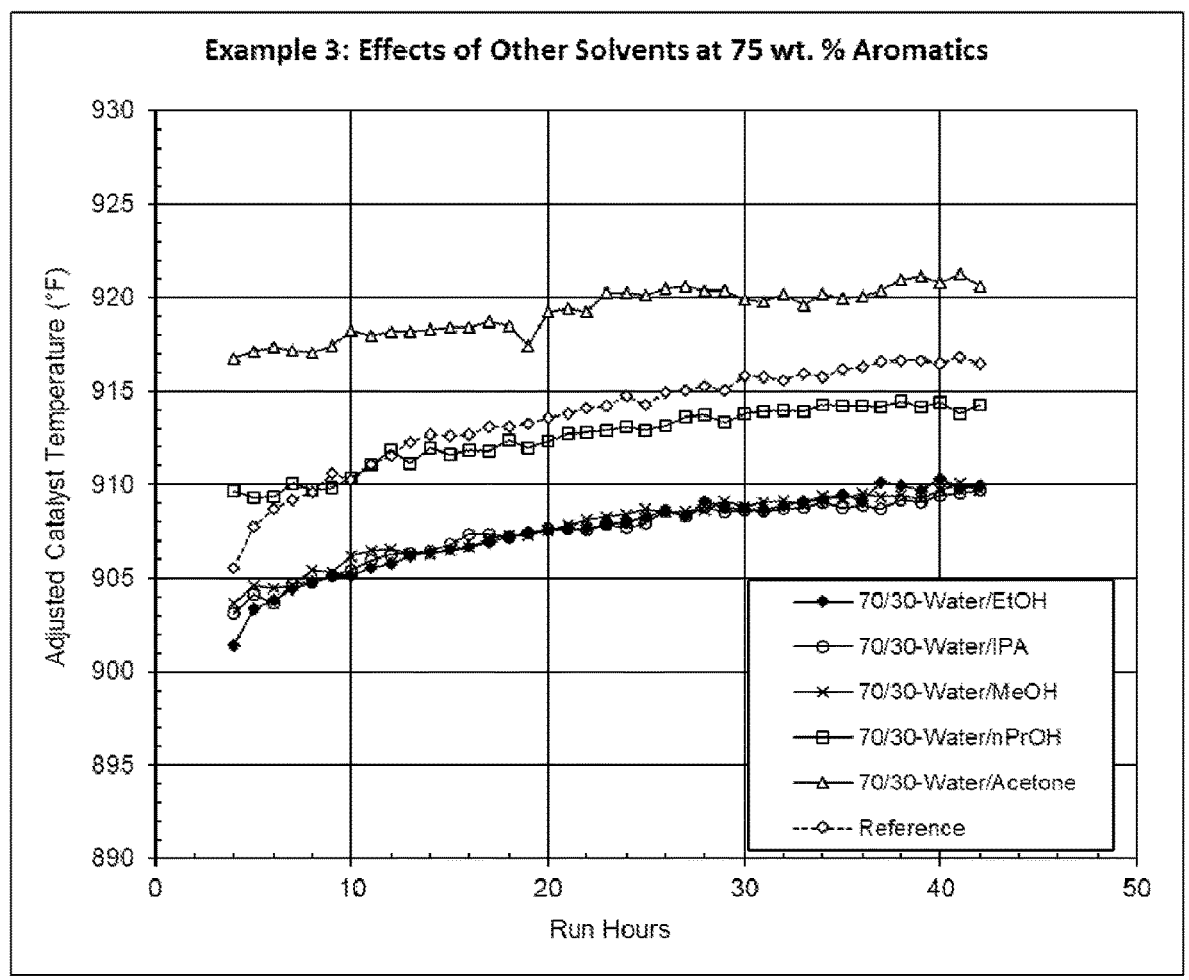
FIG. 7 presents a plot of the yield-adjusted temperature versus reaction time for the supported catalysts of Example 3.
Figure 8:
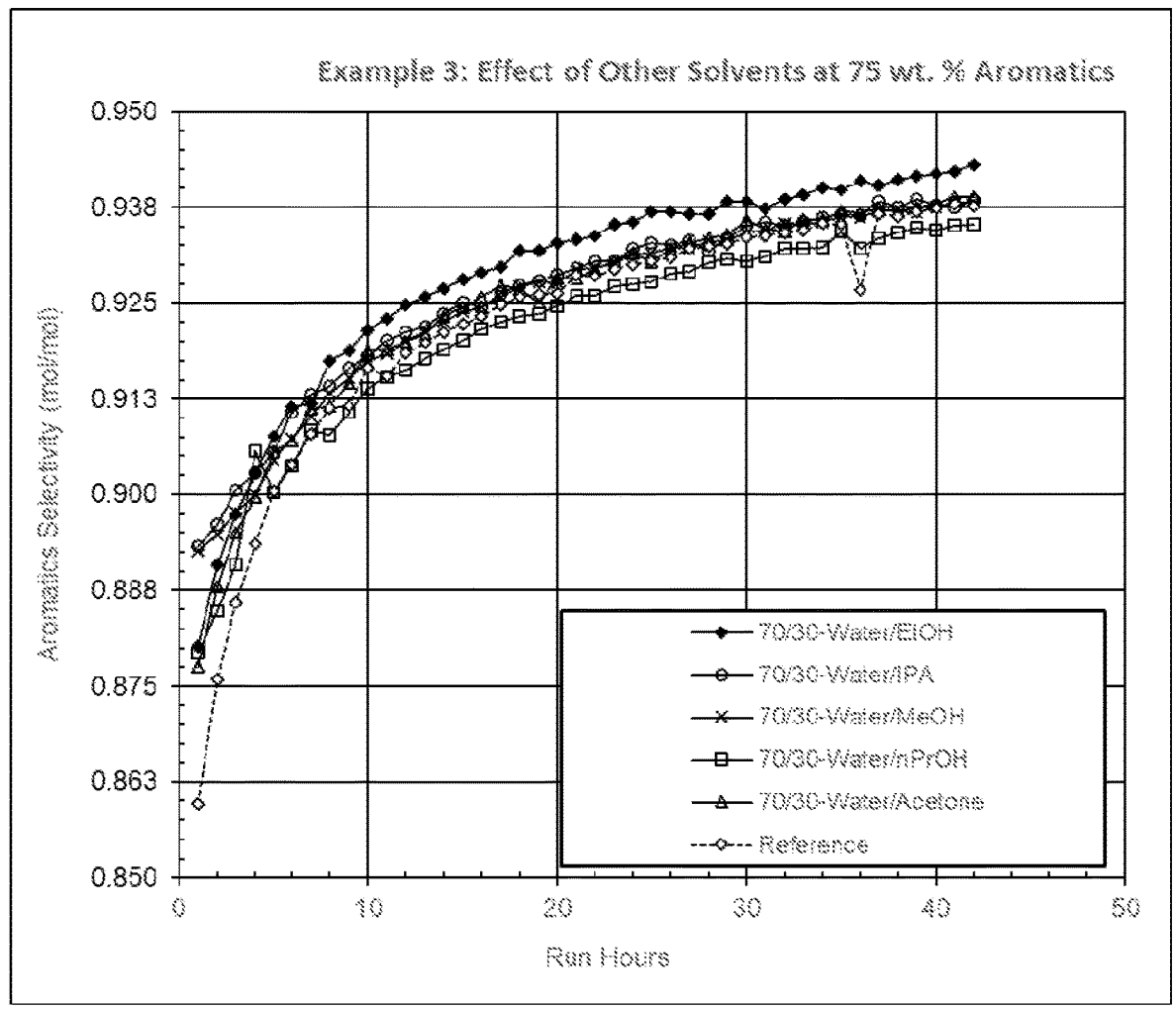
FIG. 8 presents a plot of the molar aromatics selectivity versus reaction time for the supported catalysts of Example 3.

In Example 3, supported catalysts were produced as described in Examples 1-2, except that catalysts were prepared with water (reference), 30 wt. % ethanol, 30 wt. % isopropyl alcohol, 30 wt. % n-propanol, 30 wt. % methanol, 30 wt. % acetone, or 30 wt. % n-butanol. Using the 40-hr test procedure described above, the activity and selectivity to aromatics were determined for each catalyst, except n-butanol. Usable catalysts could not be synthesized using n-butanol because it was not fully miscible with water and the salt precursors could not be solubilized for impregnation. FIGS. 5-6 summarize the results for 83.5 wt. % aromatics yield, while FIGS. 7-8 summarize the results for 75 wt. % aromatics yield.

The use of isopropanol and methanol during catalyst preparation resulted in the same surprising catalyst activity enhancement as ethanol, while n-propanol did not improve catalyst activity as much as the other alcohol compounds. Unexpectedly, the use of acetone during catalyst preparation significantly reduced catalyst activity—a much higher reaction temperature was needed to result in the same aromatics yield. As to selectivity, the aromatics selectivity was generally the same for each catalyst.

Example 4

Figure 9:
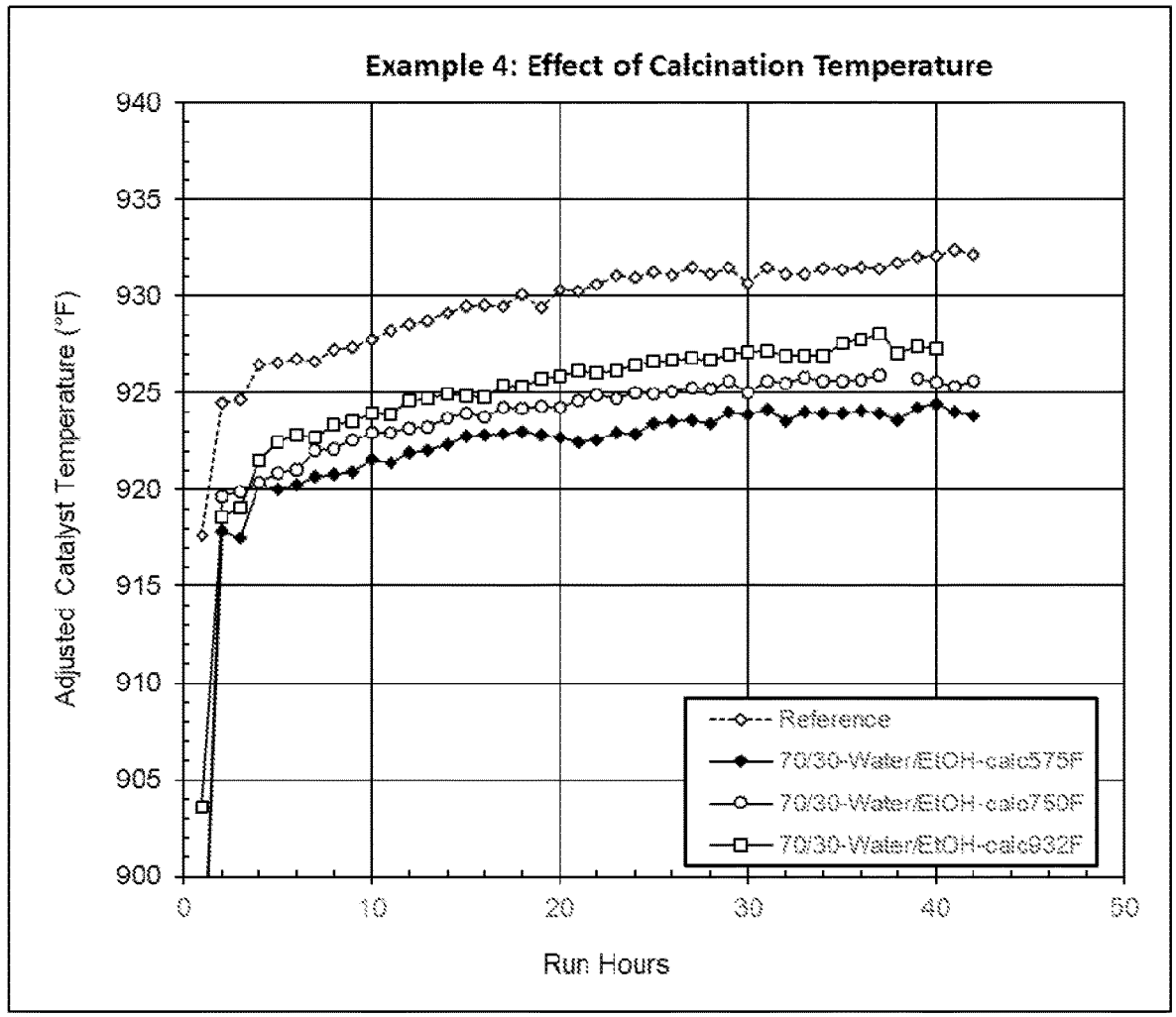
FIG. 9 presents a plot of the yield-adjusted temperature versus reaction time for the supported catalysts of Example 4.
Figure 10:
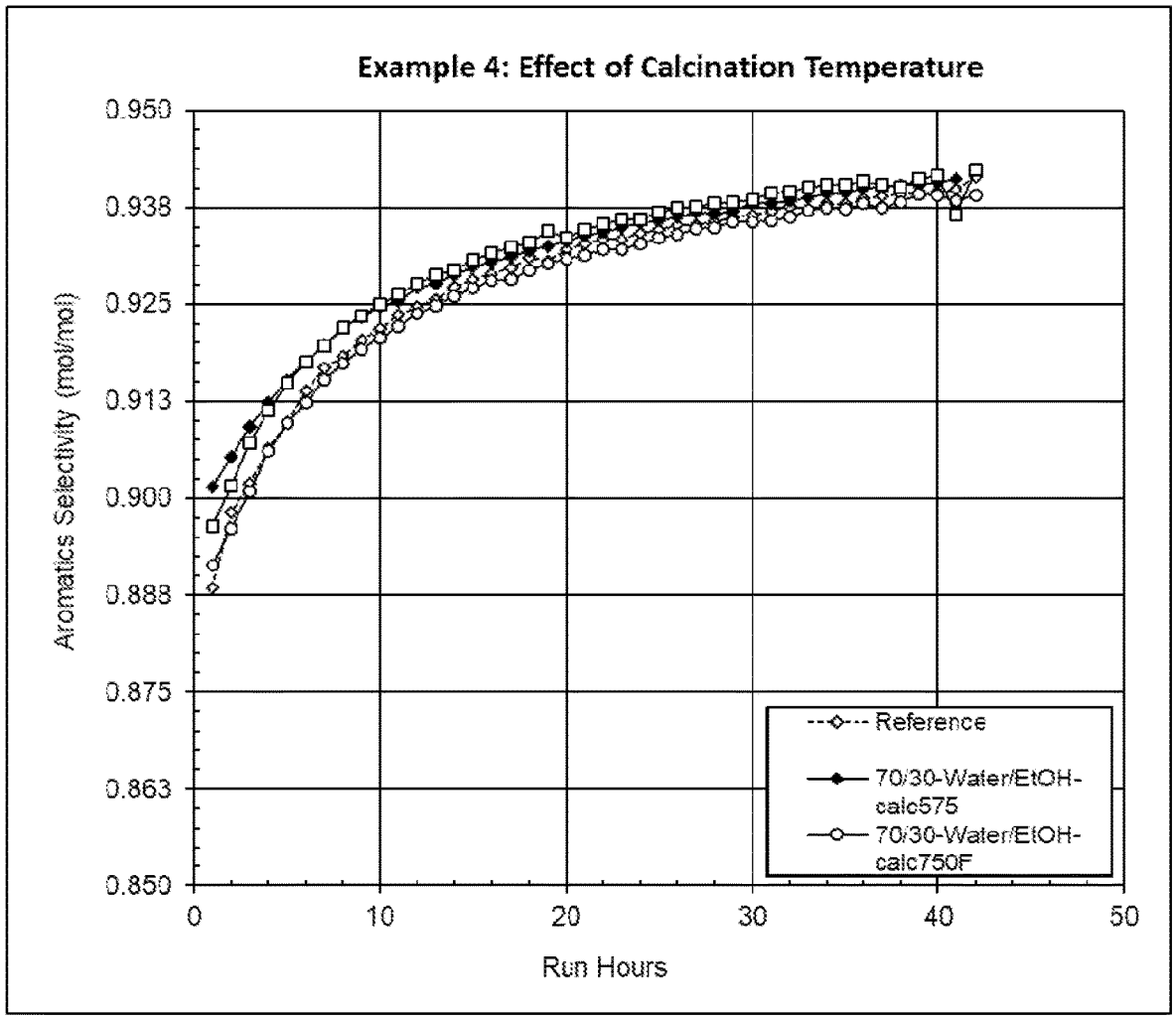
FIG. 10 presents a plot of the molar aromatics selectivity versus reaction time for the supported catalysts of Example 4.

In Example 4, supported catalysts were produced as described in Examples 1-2, except that catalysts were prepared with water (reference) or with 30 wt. % ethanol, the latter being split into three batches, which were calcined at 575° F. (302° C.), 750° F. (399° C.), and 932° F. (500° C.). Despite the fact that higher temperature calcination generally results in lower initial activity, FIG. 9 illustrates that supported catalysts prepared at all calcination temperatures showed better activity than the reference catalyst. The selectivity data in FIG. 10 indicates that the aromatics selectivities of the respective catalysts were comparable.

Example 5

In Example 5, supported catalysts were produced by first impregnating the halogens (F, Cl) in water. For the reference catalyst, platinum was impregnated in water, while for the experimental catalyst, platinum was impregnated in a solvent composition containing 60 wt. % water and 40 wt. % ethanol. For both catalysts, the K/L-zeolite base preparation, the incipient wetness technique, the drying procedure, and calcination conditions were the same. After reduction/activation in hydrogen, the catalysts were compared using the 40-hr test procedure described above.

Figure 11:
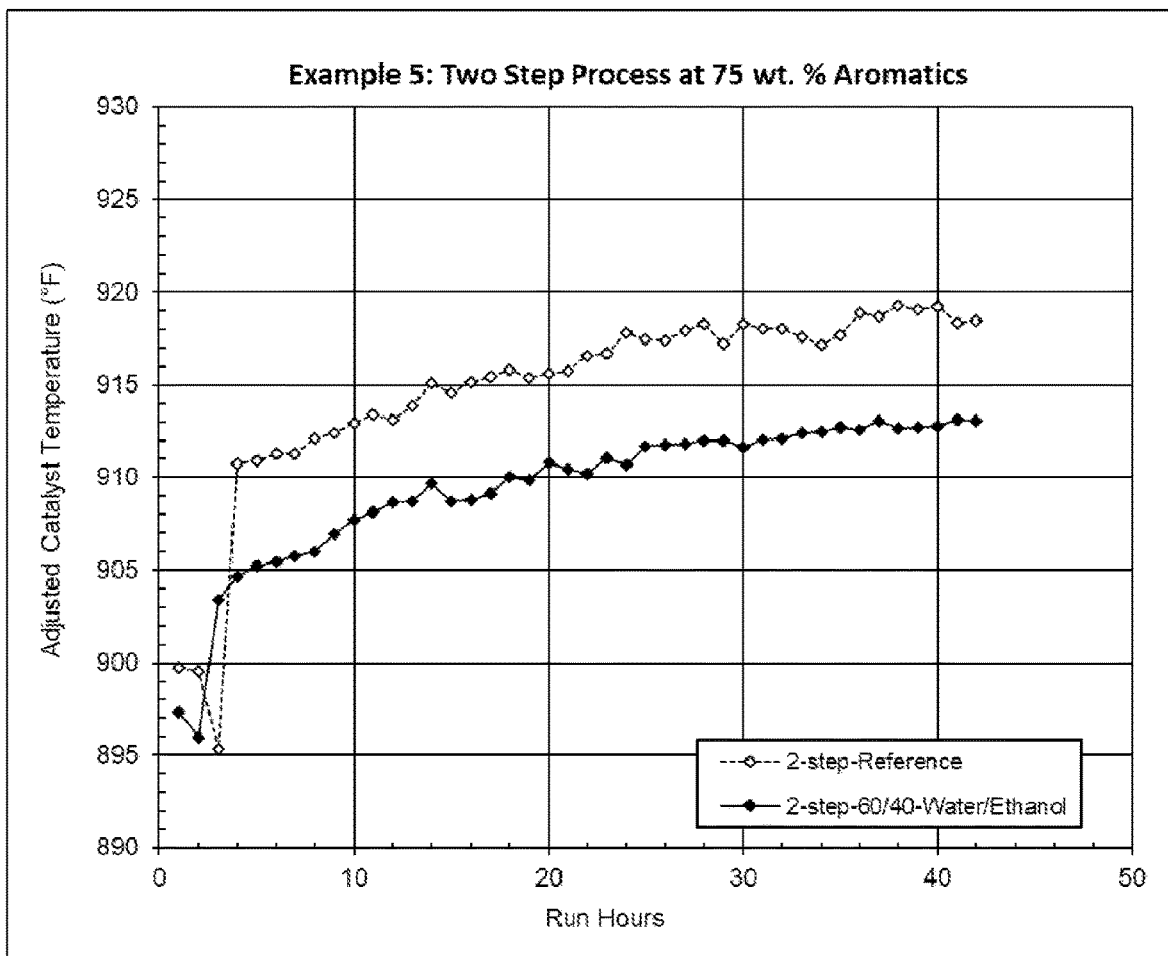
FIG. 11 presents a plot of the yield-adjusted temperature versus reaction time for the supported catalysts of Example 5.
Figure 12:
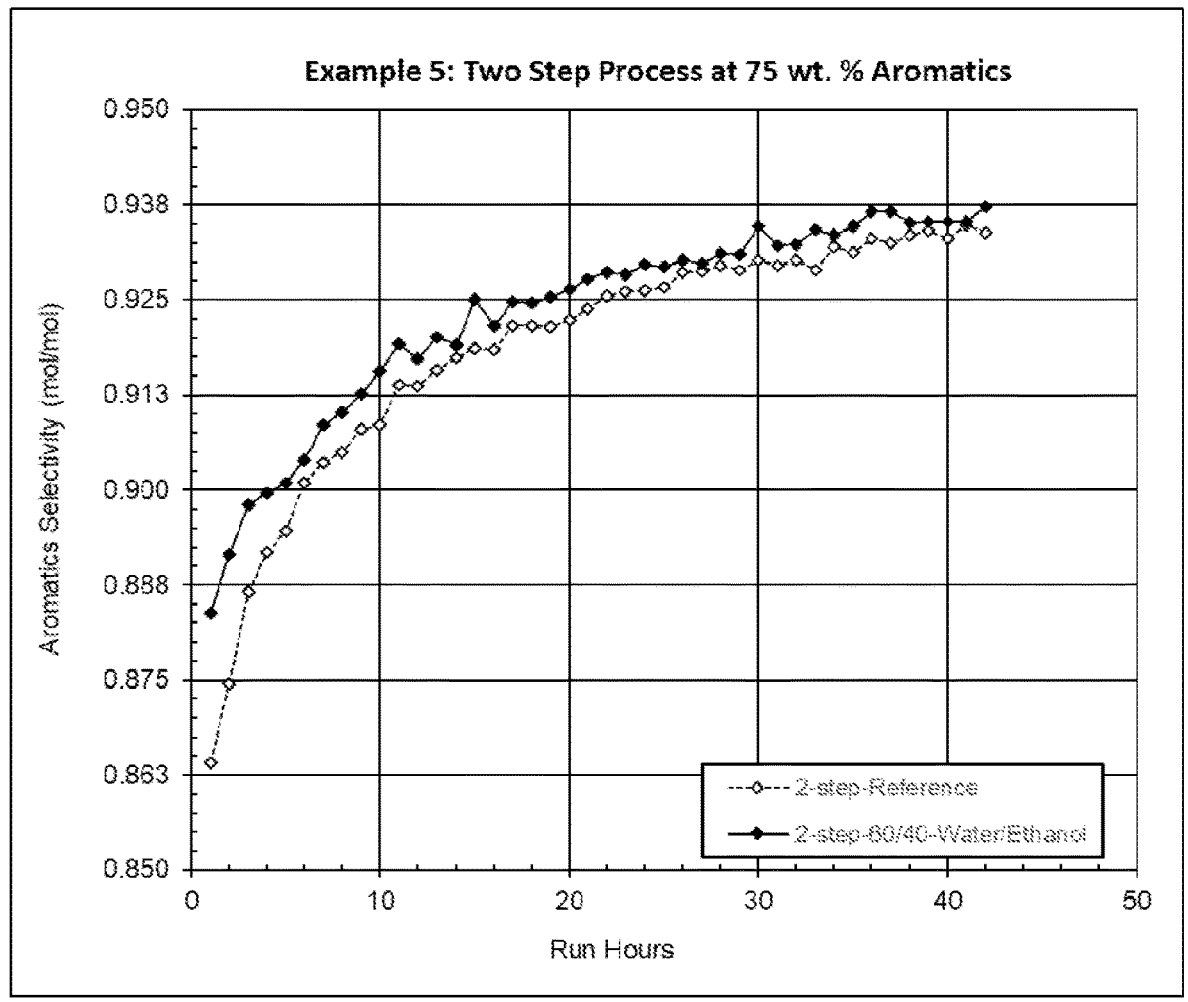
FIG. 12 presents a plot of the molar aromatics selectivity versus reaction time for the supported catalysts of Example 5.

FIG. 11 compares the yield-adjusted temperature versus reaction time for each supported catalyst, and illustrates the higher activity of the catalyst prepared using 40 wt. % ethanol as compared to the reference catalyst. Unexpectedly, the target aromatics yield of 75 wt. % was achieved at an approximate 5-10° F. (3-6° C.) lower reaction temperature for the catalyst prepared using the water/ethanol solution. In this 40-hr test, the molar selectivity to aromatics was comparable to slightly better for the catalyst prepared using the water/ethanol solution, as shown in FIG. 12.

Example 6

In Example 6, supported catalysts were produced by first impregnating F in water, then drying and calcining. For the reference catalyst, platinum and Cl then were impregnated in water, while for the experimental catalyst, platinum and Cl were impregnated in a solvent composition containing 70 wt. % water and 30 wt. % ethanol. For both catalysts, the K/L-zeolite base preparation, the incipient wetness technique, the drying procedure, and calcination conditions were the same. After reduction/activation in hydrogen, the catalysts were compared using the 40-hr test procedure described above.

Figure 13:
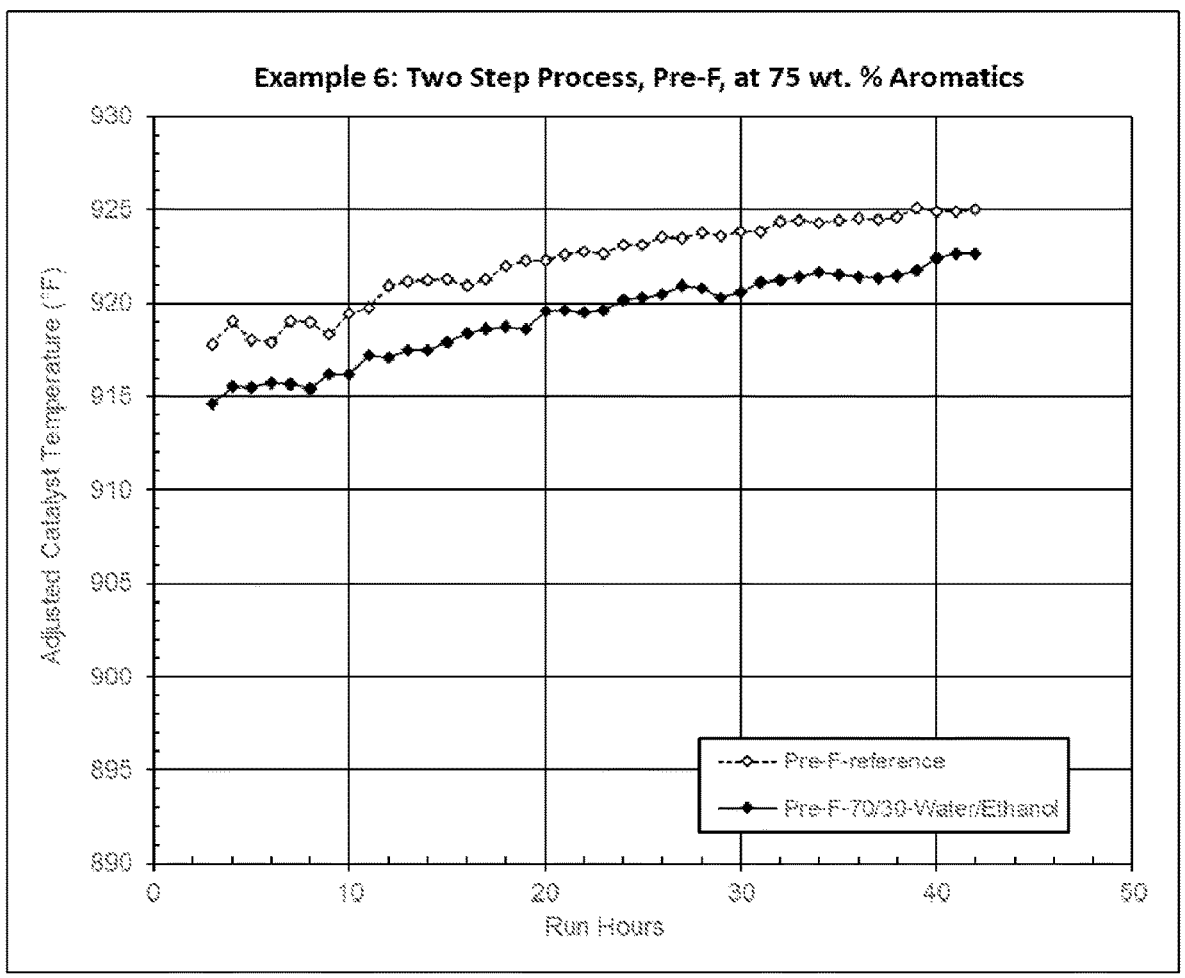
FIG. 13 presents a plot of the yield-adjusted temperature versus reaction time for the supported catalysts of Example 6.
Figure 14:
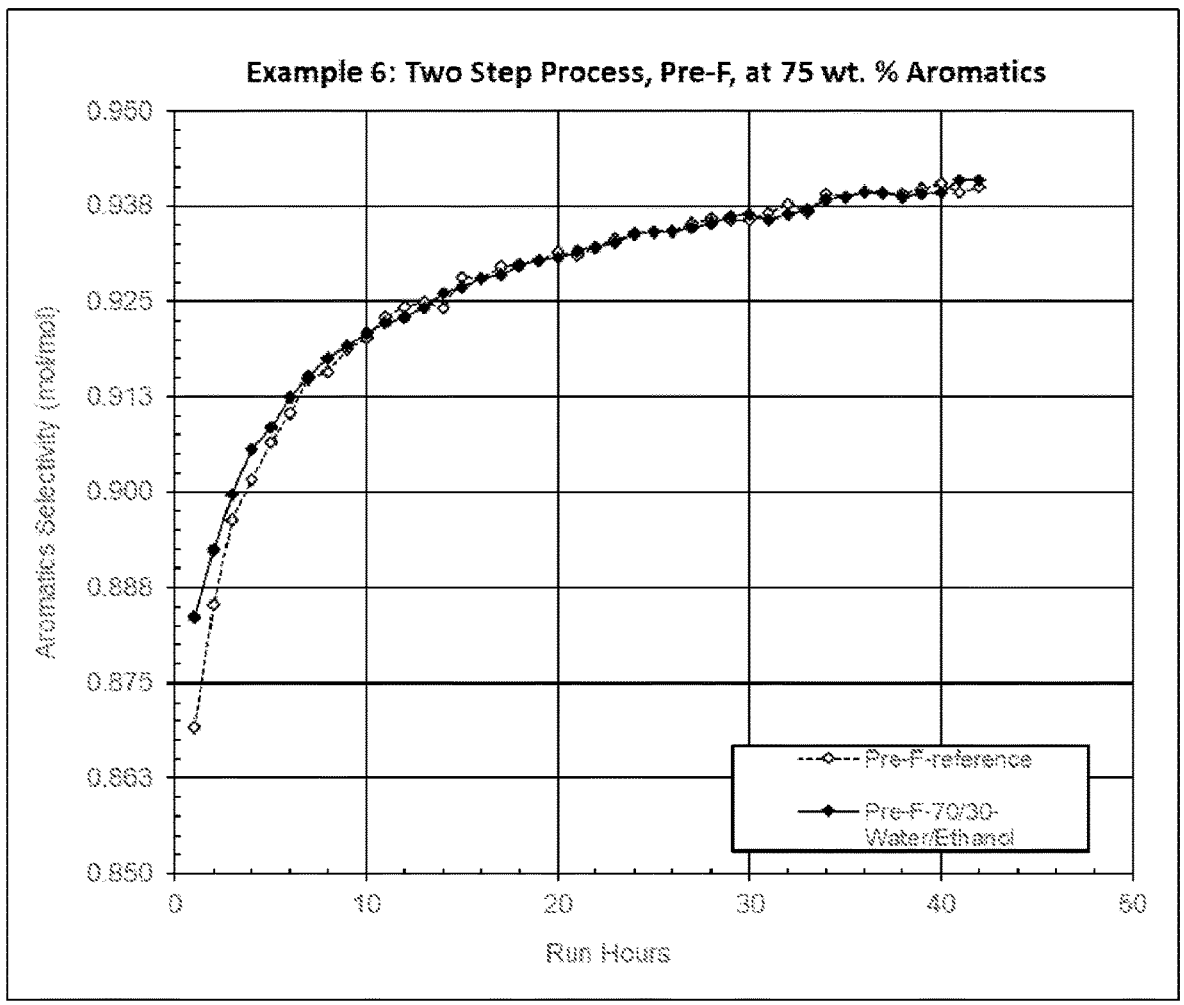
FIG. 14 presents a plot of the molar aromatics selectivity versus reaction time for the supported catalysts of Example 6.

FIG. 13 compares the yield-adjusted temperature versus reaction time for each supported catalyst, and illustrates the higher activity of the catalyst prepared using 30 wt. % ethanol as compared to the reference catalyst. Unexpectedly, the target aromatics yield of 75 wt. % was achieved at a lower reaction temperature for the catalyst prepared using the water/ethanol solution. In this 40-hr test, the molar selectivity to aromatics was the same for the catalyst prepared using the water/ethanol solution, as shown in FIG. 14.

Example 7

Figure 15:
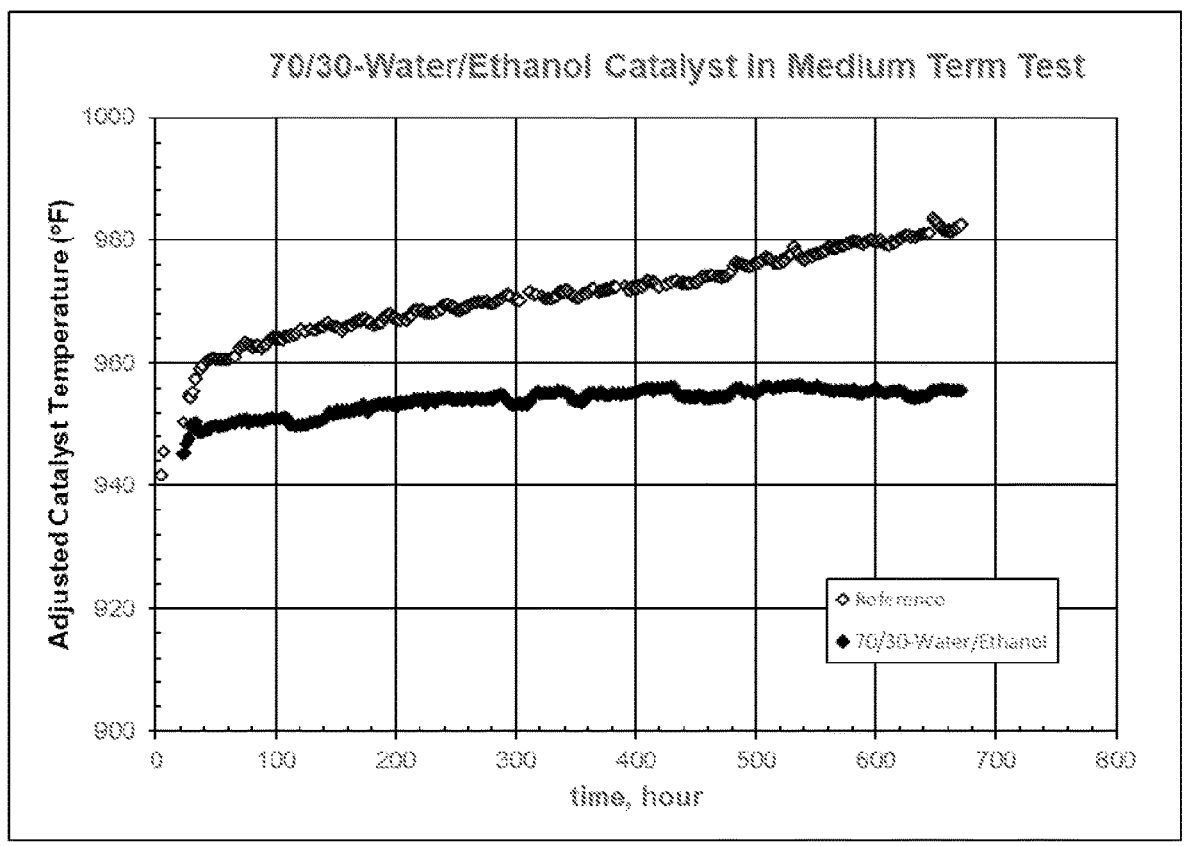
FIG. 15 presents a plot of the yield-adjusted temperature versus reaction time for the supported catalysts of Example 7.
Figure 16:
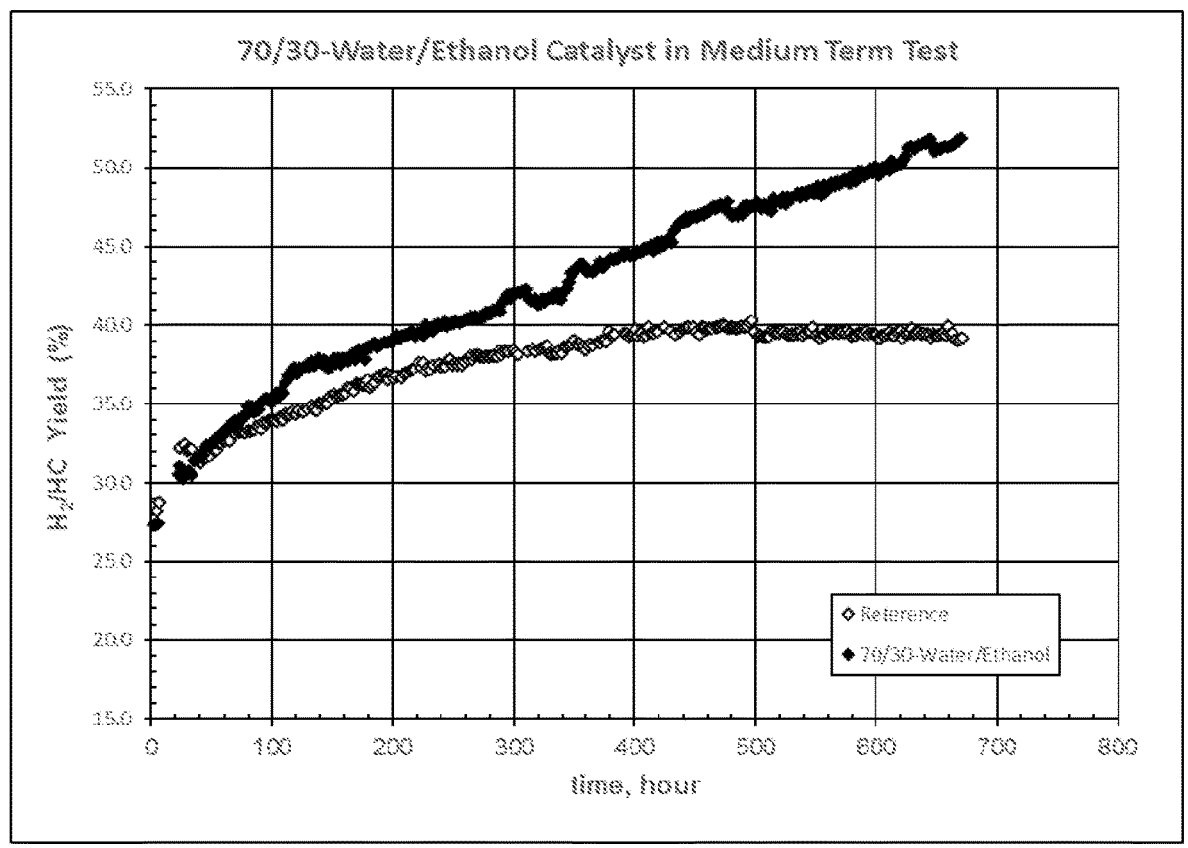
FIG. 16 presents a plot of the hydrogen to hydrocarbon (methane) ratio versus time for the supported catalysts of Example 7.

In Example 7, supported catalysts were produced as described in Example 1, but were subjected to a medium term test for 600 hr on stream using 5 cc of 20/40 mesh catalyst. All other conditions were similar to the 40-hr test procedure described above, and likewise, the medium term test also demonstrated higher activity for the catalyst prepared using 30 wt. % ethanol, as shown in FIG. 15. Additionally, the catalyst prepared using ethanol had a surprisingly low fouling rate (FR) of 0.0084° F./hr (0.0047° C./hr), which was less than one-third of the fouling rate of the reference catalyst. A lower fouling rate translates to a higher on-stream time and with consistent stability. The higher long-term selectivity for the catalyst prepared using ethanol is illustrated in FIG. 16, which shows significantly higher $H_2/CH_4$ yield, particularly in the 400-hr to 600-hr range.

Example 8

In Example 8, a reference catalyst and a catalyst prepared with 30% ethanol were evaluated for long-term activity and stability performance, and catalyst fouling rate. For this 2500-hr test, 80 cc of the supported catalyst (whole extrudates) was reduced in 50 mol % hydrogen in nitrogen, then a feed stream of aliphatic hydrocarbons and molecular hydrogen was introduced to a 1" reactor containing the catalyst at a pressure of 65 psig, a hydrogen:hydrocarbon ratio of 2:1, and a LHSV=1.6 $hr^{-1}$ to obtain catalyst performance data over time. The total yield of aromatics was maintained at 83.5 wt. % over the 2500-hr run by adjusting the temperature to maintain the desired yield, as described above for the 40-hr test.

Figure 17:
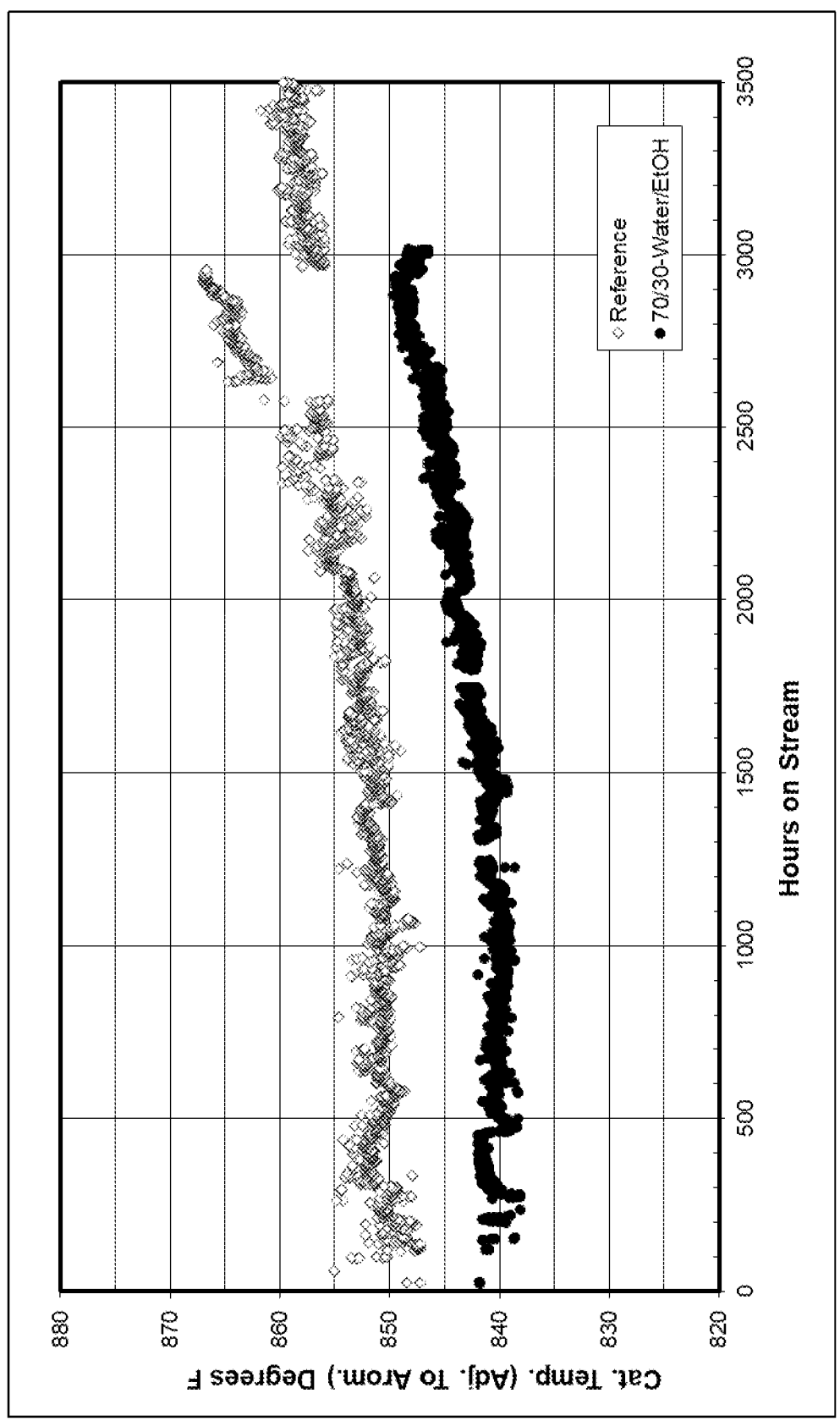
FIG. 17 presents a plot of the yield-adjusted temperature versus reaction time for the supported catalysts of Example 8.
Figure 18:
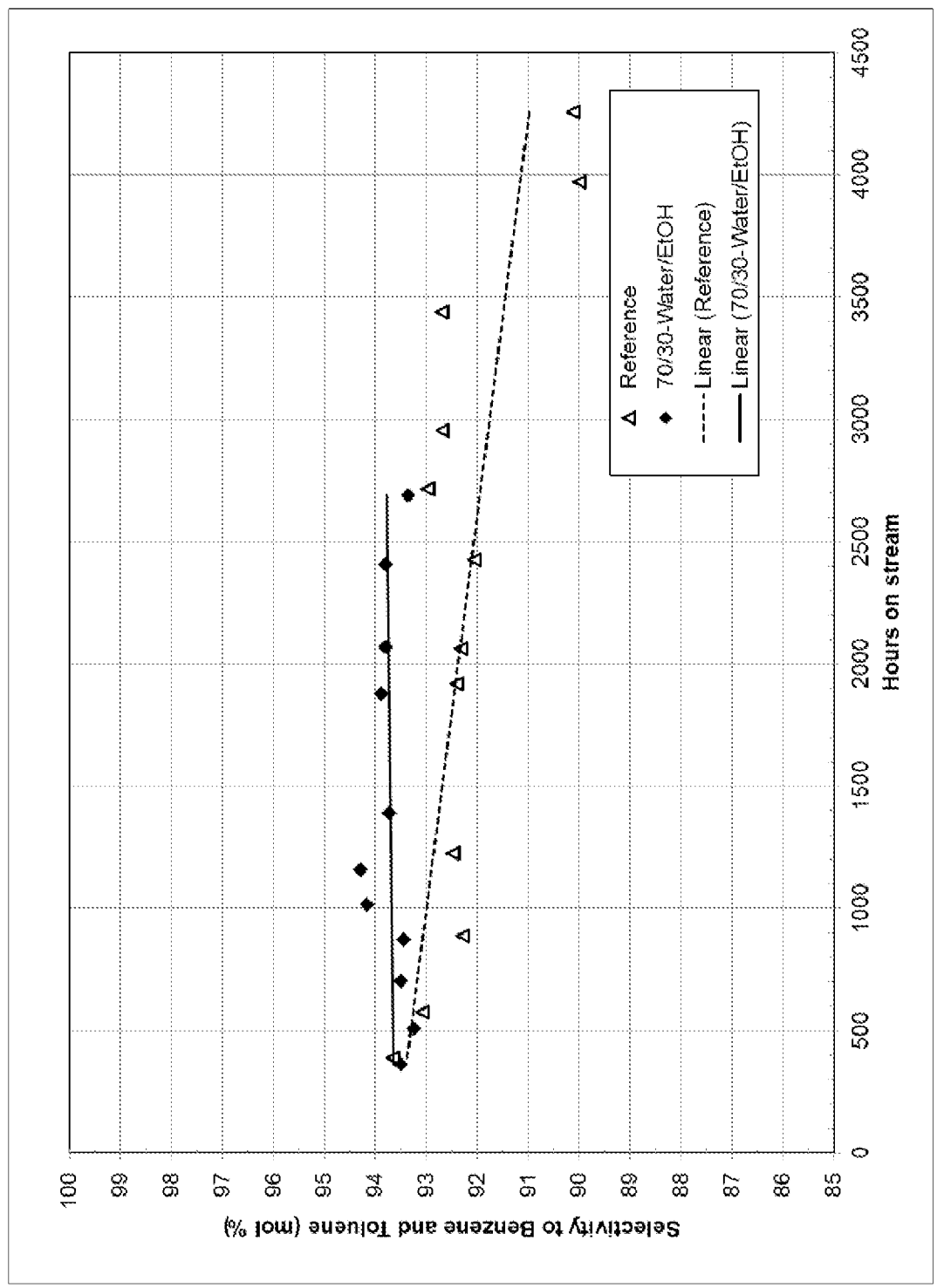
FIG. 18 presents a plot of the molar benzene+toluene selectivity for the supported catalysts of Example 8.

FIG. 17 shows a lower adjusted catalyst temperature of about 10° F. (6° C.) to achieve the 83.5 wt. % aromatics yield for the catalyst prepared using ethanol as compared to the reference catalyst, while FIG. 18 illustrates a molar selectivity to benzene+toluene for the catalyst prepared using ethanol that was almost 2 mol % higher than the reference catalyst.

Example 9

Figure 19:
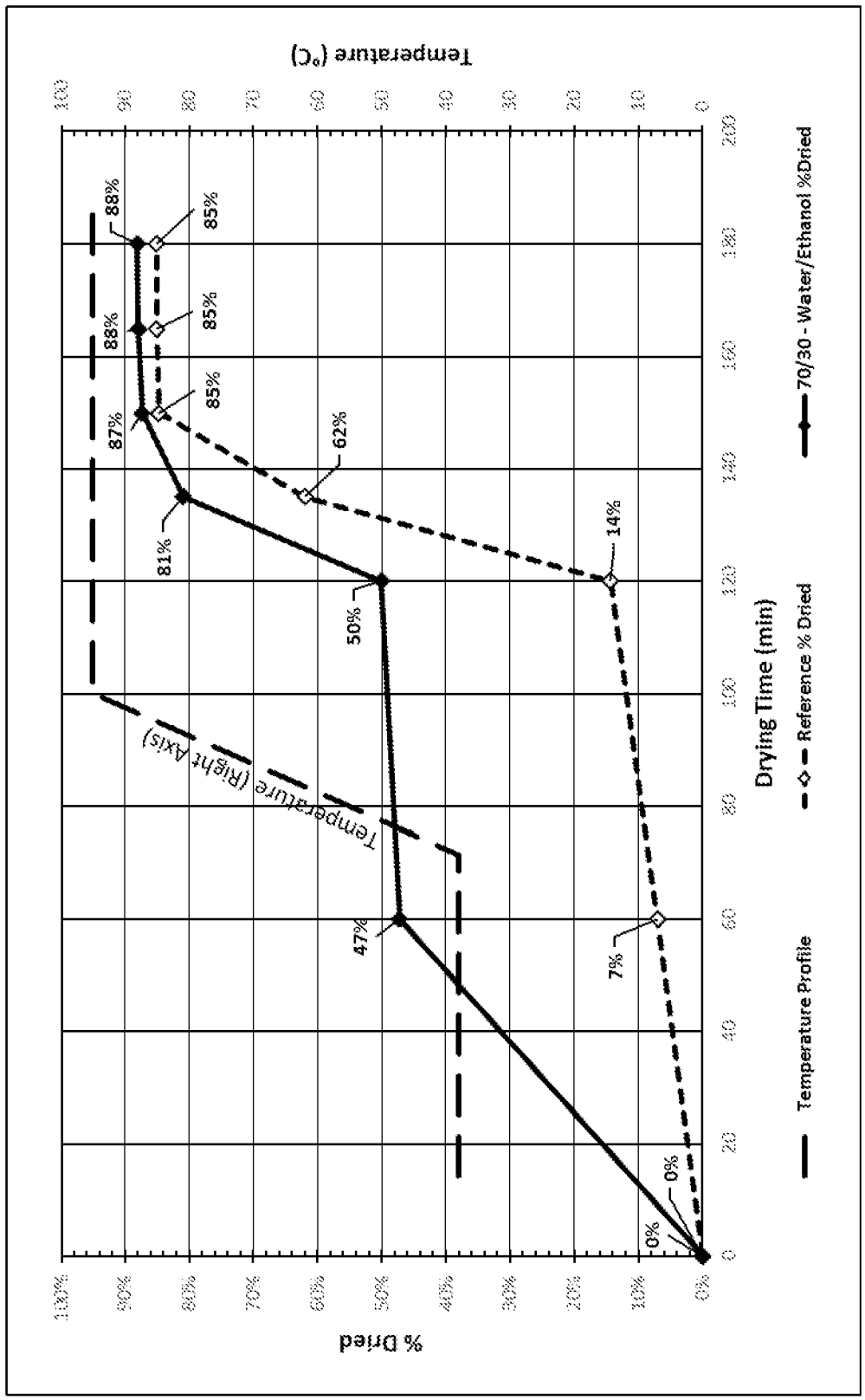
FIG. 19 presents a plot of the percent drying versus drying time for the supported catalysts of Example 9.

Example 9 is a drying rate comparison between a reference catalyst and the experimental catalyst that was prepared using 30 wt. % ethanol, as described in Example 1. FIG. 19 demonstrates that up to 50 wt. % of the impregnation solvent had been removed from the experimental catalyst in the first step of drying at the lower temperature of 38° C., whereas only 14 wt. % of the impregnation solvent (water) was removed from the reference catalyst. While not wishing to be bound by theory, it is believed that when ethanol is present, the drying rate is much faster and occurs under milder conditions, which might be beneficial for the component distribution in the zeolitic pores during solvent removal.

Example 10

Example 10 compares the platinum dispersion, determined by static CO chemisorption, for the reference catalyst and the experimental catalyst that was prepared using 30 wt. % ethanol, as described in Example 1. As shown in Table I, both catalysts had similar platinum dispersions. Thus, unexpectedly, the experimental catalyst demonstrated superior catalyst activity despite no difference in platinum dispersion.

TABLE I

Example 10-Platinum Dispersion.

| Catalyst | Platinum Dispersion (%) |
|---|---|
| Reference (water) | 69.4 |
| Experimental (30 wt. % ethanol) | 68.5 |

Example 11

Figure 20:
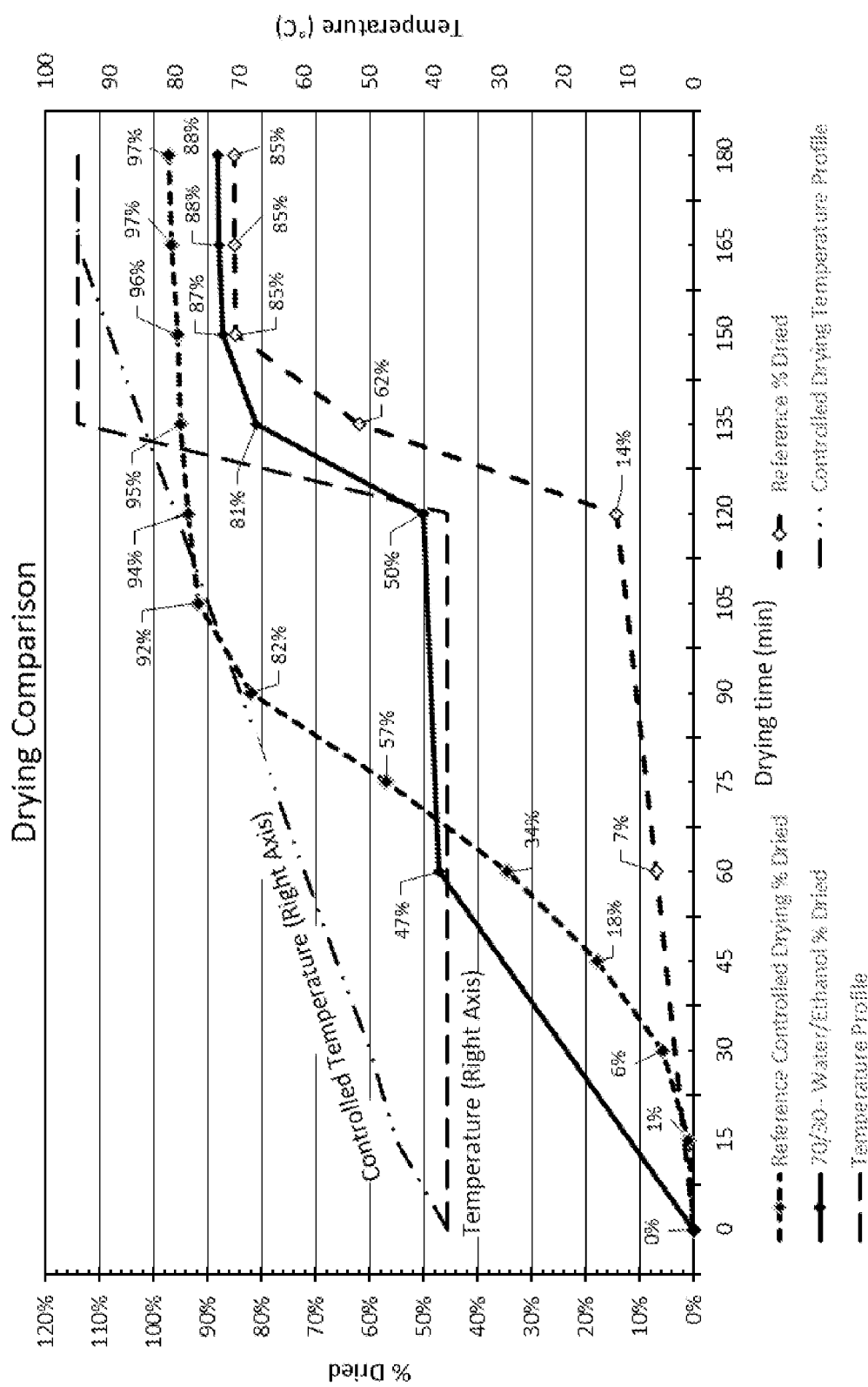
FIG. 20 presents a plot of the percent drying versus drying time for the supported catalysts of Example 11.

Example 11 is a drying rate comparison between a reference catalyst and a controlled drying version of the reference catalyst (both used 100% water during impregnation). The controlled drying version of the reference catalyst was dried using a slow heating rate designed to mimic the milder drying of Example 9 and FIG. 19. FIG. 20 illustrates the slow drying of the controlled drying version of the reference catalyst, in which 57 wt. % of the impregnation solvent had been removed by a temperature of 50° C.

Figure 21:
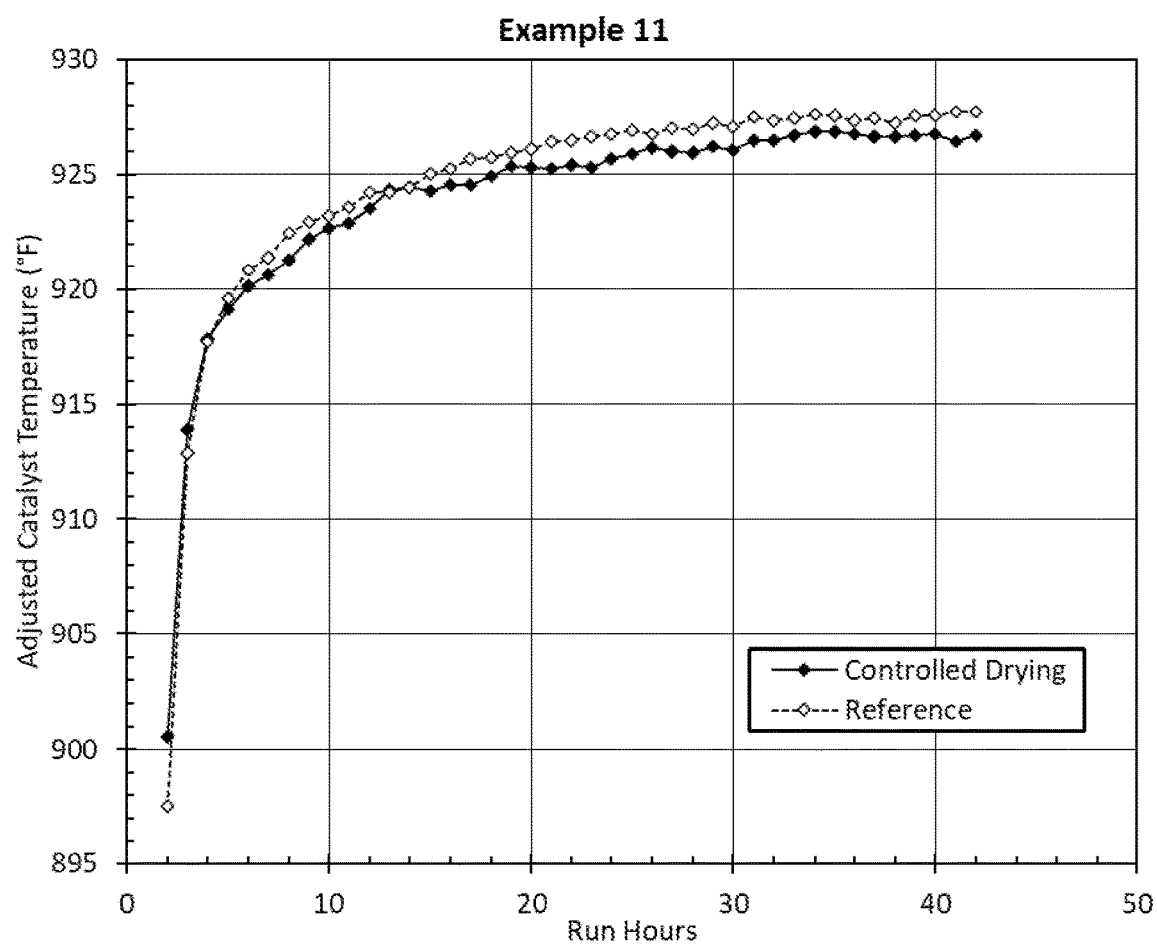
FIG. 21 presents a plot of the yield-adjusted temperature versus reaction time for the supported catalysts of Example 11.

Similar to Examples 1-2, the reference catalyst and the controlled drying version of the reference catalyst were compared using the 40-hr test procedure described above. The activity (83.5 wt. aromatics yield) was determined for each catalyst, and FIG. 21 summarizes the results. Surprisingly, there was no difference in the catalytic activity of the reference catalyst and the controlled drying version of the reference catalyst. Thus, controlled drying alone with water did not provide the beneficial effect that was observed when using the alcohol compound. Accordingly, the premise that the presence of the alcohol simply results in milder drying, as per Example 9, does not appear to completely explain the benefits of alcohol addition.

Example 12

Figure 22:
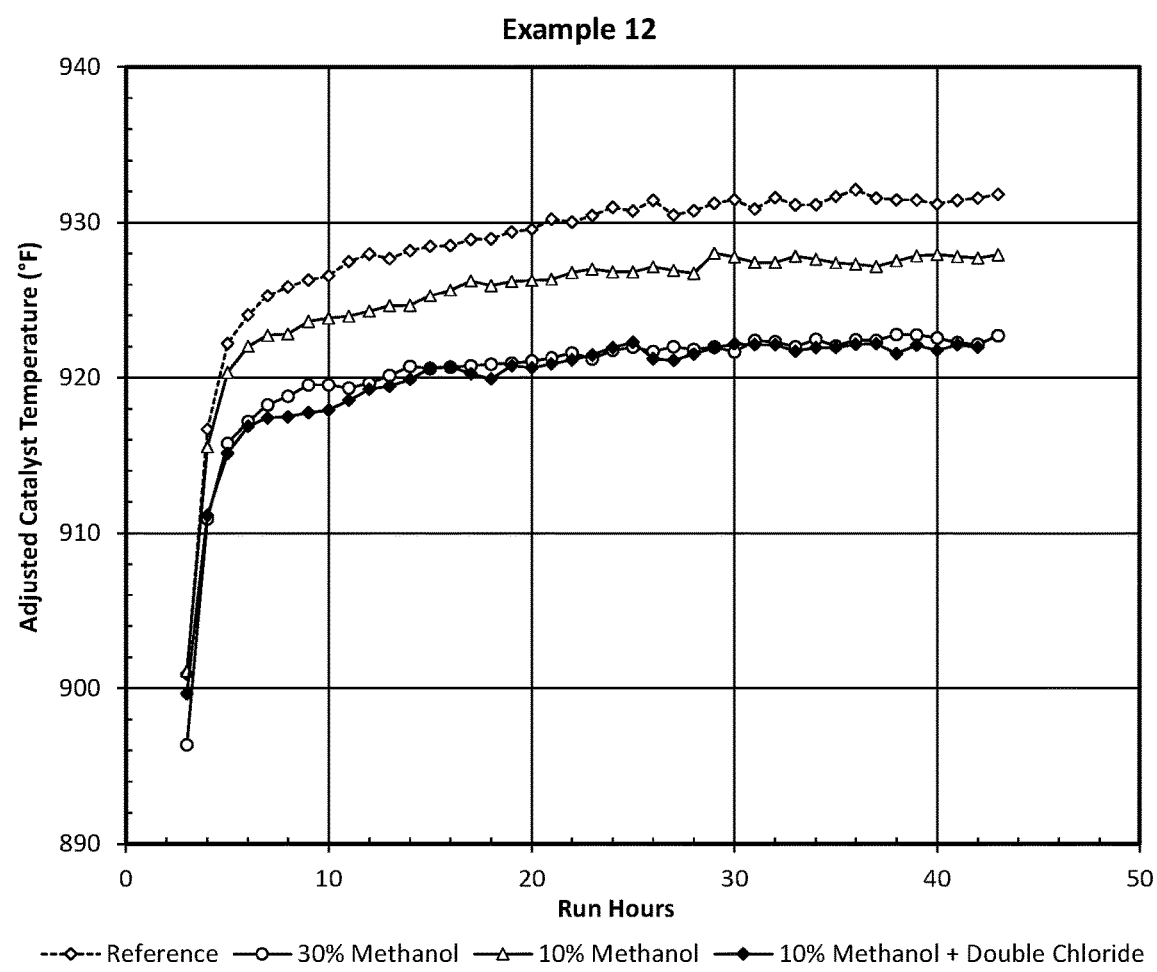
FIG. 22 presents a plot of the yield-adjusted temperature versus reaction time for the supported catalysts of Example 12.

In Example 12, supported catalysts were produced as described in Examples 1-2, except that catalysts were prepared with water (reference), 10 wt. % methanol, or 30 wt. % methanol. Another catalyst was prepared with double chlorine (1.7 wt. % chlorine) and 10 wt. % methanol. Using the 40-hr test procedure described above, the activity was determined for each catalyst, and FIG. 22 summarizes the results for 83.5 wt. % aromatics yield.

Beneficially, all levels of methanol (from 10 to 30 wt. %) improved the catalyst activity. As the amount of methanol was increased, the catalyst activity increased accordingly. Unexpectedly, the catalyst prepared using double chlorine and 10 wt. % methanol had comparable performance to that of the standard catalyst prepared with 30 wt. % ethanol.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A method of producing a supported catalyst, the method comprising:
  (a) impregnating a bound zeolite base with, in any order:
    a transition metal precursor in a solvent composition containing water and from about 5 wt. % to about 50 wt. % of a $C_1$ to $C_3$ alcohol compound,
    a chlorine precursor, and
    a fluorine precursor, to form an impregnated zeolite base; and
  (b) drying and then calcining the impregnated zeolite base to produce the supported catalyst, wherein the supported catalyst comprises, based on the total weight of the supported catalyst:
    from about 0.1 wt. % to about 10 wt. % of a transition metal;
    from about 0.1 wt. % to about 5 wt. % of chlorine; and
    from about 0.1 wt. % to about 5 wt. % of fluorine.

Aspect 2. The method defined in aspect 1, wherein the alcohol compound comprises methanol, ethanol, n-propanol, isopropanol, or any combination thereof.

Aspect 3. The method defined in aspect 1, wherein the alcohol compound comprises ethanol.

Aspect 4. The method defined in any one of the preceding aspects, wherein the solvent composition comprises any weight percentage of the alcohol compound disclosed herein, e.g., from about 5 wt. % to about 40 wt. %, from about 10 wt. % to about 40 wt. %, from about 10 wt. % to about 35 wt. %, or from about 10 wt. % to about 30 wt. %, of the alcohol compound.

Aspect 5. The method defined in any one of aspects 1-4, wherein the bound zeolite base is impregnated with the chlorine precursor and/or the fluorine precursor before the transition metal precursor.

Aspect 6. The method defined in any one of aspects 1-5, wherein the bound zeolite base is impregnated with a solution containing water and the chlorine precursor and/or the fluorine precursor.

Aspect 7. The method defined in any one of aspects 1-6, wherein the bound zeolite base is impregnated with the transition metal precursor and the chlorine precursor (or the fluorine precursor, or both the chlorine precursor and the fluorine precursor) in the solvent composition containing water and from about 5 wt. % to about 50 wt. % of the $C_1$ to $C_3$ alcohol compound.

Aspect 8. The method defined in any one of the preceding aspects, further comprising the following steps before step (a):
  combining a zeolite with a binder to form a mixture, and extruding the mixture to form an extrudate;
  drying and calcining the extrudate to form a calcined base; and
  washing, drying, and calcining the calcined base to form the bound zeolite base.

Aspect 9. The method defined in any one of the preceding aspects, wherein drying and then calcining the impregnated zeolite base comprises any suitable drying conditions or any drying conditions disclosed herein, e.g., a drying temperature in a range from about 30° C. to about 200° C., or from about 80° C. to about 100° C., and drying at atmospheric pressure or sub-atmospheric pressure, e.g., less than about 150 Torr, or less than about 50 Torr.

Aspect 10. The method defined in any one of the preceding aspects, wherein drying and then calcining the impregnated zeolite base comprises any suitable calcining conditions or any calcining conditions disclosed herein, e.g., a peak calcining temperature in a range from about 200° C. to about 500° C., or from about 230° C. to about 450° C., and in a calcining gas stream comprising nitrogen, oxygen, air, or any combination thereof.

Aspect 11. The method defined in aspect 10, wherein the peak calcining temperature is in a range from about 275° C. to about 425° C., or from about 300° C. to about 400° C.

Aspect 12. The method defined in any one of the preceding aspects, wherein the method further comprises a reducing step after the drying and calcining of the impregnated zeolite base, the reducing step comprising contacting the supported catalyst with any suitable reducing gas stream or any reducing gas stream disclosed herein (e.g., comprising hydrogen) to produce a reduced (or activated) supported catalyst.

Aspect 13. The method defined in aspect 12, wherein the reducing step is conducted at any suitable reducing temperature or any reducing temperature disclosed herein, e.g., in a range from about 100° C. to about 700° C., or from about 200° C. to about 600° C.

Aspect 14. The method defined in any one of the preceding aspects, wherein the transition metal precursor comprises any suitable transition metal precursor or any transition metal precursor disclosed herein, e.g., tetraamineplatinum(II) chloride, tetraamineplatinum(II) nitrate, platinum(II) acetylacetonate, platinum(II) chloride, ammonium tetrachloroplatinate(II), chloroplatinic acid, platinum (II) nitrate, or a combination thereof.

Aspect 15. The method defined in any one of the preceding aspects, wherein the chlorine precursor comprises any suitable chlorine precursor or any chlorine precursor disclosed herein, e.g., ammonium chloride, tetramethylammonium chloride, tetraethylammonium chloride, tetrapropylammonium chloride, tetrabutylammonium chloride, methyltriethylammonium chloride, or a combination thereof.

Aspect 16. The method defined in any one of the preceding aspects, wherein the fluorine precursor comprises any suitable fluorine precursor or any fluorine precursor disclosed herein, e.g., ammonium fluoride, tetramethylammonium fluoride, tetraethylammonium fluoride, tetrapropylammonium fluoride, tetrabutylammonium fluoride, methyltriethylammonium fluoride, or a combination thereof.

Aspect 17. The method defined in any one of the preceding aspects, wherein the supported catalyst comprises any weight percentage of chlorine disclosed herein, e.g., from about 0.3 wt. % to about 4 wt. %, from about 0.4 wt. % to about 3.5 wt. %, from about 0.5 wt. % to about 3.3 wt. %, from about 1.8 wt. % to about 3.2 wt. %, or from about 0.5 wt. % to about 1.5 wt. % chlorine.

Aspect 18. The method defined in any one of the preceding aspects, wherein the supported catalyst comprises any weight percentage of fluorine disclosed herein, e.g., from about 0.3 wt. % to about 4 wt. %, from about 0.4 wt. % to about 3 wt. %, from about 0.3 wt. % to about 2 wt. %, or from about 0.4 wt. % to about 1.5 wt. % fluorine.

Aspect 19. The method defined in any one of the preceding aspects, wherein the bound zeolite base (or the supported catalyst) comprises a zeolite and a binder.

Aspect 20. The method defined in aspect 19, wherein the bound zeolite base (or the supported catalyst) comprises any weight percentage of binder disclosed herein, e.g., from about 3 wt. % to about 35 wt. %, or from about 5 wt. % to about 30 wt. % binder, based on the total weight of the bound zeolite base (or the supported catalyst).

Aspect 21. The method defined in aspect 19 or 20, wherein the binder comprises an inorganic solid oxide, a clay, or a combination thereof.

Aspect 22. The method defined in aspect 19 or 20, wherein the binder comprises alumina, silica, magnesia, boria, titania, zirconia, a mixed oxide thereof, or a mixture thereof.

Aspect 23. The method defined in aspect 19 or 20, wherein the binder comprises silica.

Aspect 24. The method defined in any one of the preceding aspects, wherein the bound zeolite base (or the supported catalyst) comprises a bound L-zeolite.

Aspect 25. The method defined in any one of aspects 1-23, wherein the bound zeolite base (or the supported catalyst) comprises a bound barium ion-exchanged L-zeolite.

Aspect 26. The method defined in any one of aspects 1-23, wherein the bound zeolite base (or the supported catalyst) comprises a bound K/L-zeolite.

Aspect 27. The method defined in any one of aspects 1-23, wherein the bound zeolite base (or the supported catalyst) comprises a silica-bound L-zeolite.

Aspect 28. The method defined in aspect 27, further comprising the following steps before step (a):

combining a K/L-zeolite with a silica sol to form a mixture, extruding the mixture to form an extrudate, drying, and calcining the extrudate to form a calcined base; and washing, drying, and calcining the calcined base to form the bound zeolite base.

Aspect 29. The method defined in any one of the preceding aspects, wherein the supported catalyst comprises any weight percentage of transition metal disclosed herein, e.g., from about 0.25 wt. % to about 5 wt. %, from about 0.5 wt. % to about 3 wt. %, or from about 0.7 wt. % to about 1.5 wt. % transition metal.

Aspect 30. The method defined in any one of the preceding aspects, wherein the transition metal comprises platinum.

Aspect 31. The method defined in any one of the preceding aspects, wherein the supported catalyst comprises any weight percentage of platinum disclosed herein, e.g., from about 0.25 wt. % to about 5 wt. %, from about 0.5 wt. % to about 3 wt. %, or from about 0.7 wt. % to about 1.5 wt. % platinum.

Aspect 32. The method defined in any one of the preceding aspects, wherein the supported catalyst is characterized by a BET surface area in any range disclosed herein, e.g., from about 100 m$^2$/g to about 300 m$^2$/g, from about 100 m$^2$/g to about 200 m$^2$/g, or from about 110 m$^2$/g to about 170 m$^2$/g.

Aspect 33. The method defined in any one of the preceding aspects, wherein the supported catalyst comprises any weight ratio of chlorine:fluorine disclosed herein, e.g., from about 1:5 to about 5:1, from about 1:3 to about 3:1, or from about 1:2 to about 2:1.

Aspect 34. The method defined in any one of the preceding aspects, wherein the supported catalyst is characterized by a platinum dispersion in any range disclosed herein, e.g., from about 40% to about 80%, from about 50% to about 80%, from about 60% to about 80%, or from about 60% to about 75%.

Aspect 35. The method defined in any one of the preceding aspects, wherein the supported catalyst has a platinum dispersion that is substantially the same as that of an otherwise identical catalyst prepared under the same catalyst preparation conditions without the alcohol compound (substantially the same means within +/−5% platinum dispersion, and more typically, the platinum dispersions are within +/−3%, or within +/−1%).

Aspect 36. The method defined in any one of the preceding aspects, wherein the supported catalyst is characterized by a 40-hr T$_{EOR}$ (end of run temperature) less than that of an otherwise identical catalyst prepared under the same catalyst preparation conditions without the alcohol compound, and evaluated under the same 40-hr aromatization reaction conditions.

Aspect 37. The method defined in any one of the preceding aspects, wherein the supported catalyst is characterized by a 40-hr T$_{SOR}$ (start of run temperature) less than that of an otherwise identical catalyst prepared under the same catalyst preparation conditions without the alcohol compound, and evaluated under the same 40-hr aromatization reaction conditions.

Aspect 38. The method defined in any one of the preceding aspects, wherein the supported catalyst is characterized by a 40-hr Fouling Rate less than that of an otherwise identical catalyst prepared under the same catalyst preparation conditions without the alcohol compound, and evaluated under the same 40-hr aromatization reaction conditions.

Aspect 39. The method defined in any one of the preceding aspects, wherein the supported catalyst is characterized by a 40-hr aromatics selectivity (or a 40-hr benzene+toluene selectivity) that is substantially the same as or greater than that of an otherwise identical catalyst prepared under the same catalyst preparation conditions without the alcohol compound, and evaluated under the same 40-hr aromatization reaction conditions.

Aspect 40. The method defined in any one of the preceding aspects, wherein the supported catalyst is characterized by a 40-hr T$_{EOR}$ (end of run temperature) in any range disclosed herein, e.g., from about 910° F. (488° C.) to about 930° F. (499° C.), or from about 910° F. (488° C.) to about 925° F. (496° C.).

Aspect 41. The method defined in any one of the preceding aspects, wherein the supported catalyst is characterized by a 40-hr $T_{SOR}$ (start of run temperature) in any range disclosed herein, e.g., from about 910° F. (488° C.) to about 925° F. (496° C.), or from about 910° F. (488° C.) to about 920° F. (493° C.).

Aspect 42. The method defined in any one of the preceding aspects, wherein the supported catalyst is characterized by a 40-hr aromatics selectivity (or a 40-hr benzene+toluene selectivity) in any range disclosed herein, e.g., at least about 92 mol %, at least about 93 mol %, or at least about 94 mol %.

Aspect 43. The method defined in any one of the preceding aspects, wherein the supported catalyst is characterized by a 600-hr $T_{EOR}$ (end of run temperature) less than that of an otherwise identical catalyst prepared under the same catalyst preparation conditions without the alcohol compound, and evaluated under the same 600-hr aromatization reaction conditions.

Aspect 44. The method defined in any one of the preceding aspects, wherein the supported catalyst is characterized by a 600-hr $T_{SOR}$ (start of run temperature) less than that of an otherwise identical catalyst prepared under the same catalyst preparation conditions without the alcohol compound, and evaluated under the same 600-hr aromatization reaction conditions.

Aspect 45. The method defined in any one of the preceding aspects, wherein the supported catalyst is characterized by a 600-hr Fouling Rate less than that of an otherwise identical catalyst prepared under the same catalyst preparation conditions without the alcohol compound, and evaluated under the same 600-hr aromatization reaction conditions.

Aspect 46. The method defined in any one of the preceding aspects, wherein the supported catalyst is characterized by a 600-hr $H_2/CH_4$ yield greater than that of an otherwise identical catalyst prepared under the same catalyst preparation conditions without the alcohol compound, and evaluated under the same 600-hr aromatization reaction conditions.

Aspect 47. The method defined in any one of the preceding aspects, wherein the supported catalyst is characterized by a 600-hr $T_{EOR}$ (end of run temperature) in any range disclosed herein, e.g., from about 930° F. (499° C.) to about 975° F. (524° C.), or from about 940° F. (504° C.) to about 965° F. (518° C.).

Aspect 48. The method defined in any one of the preceding aspects, wherein the supported catalyst is characterized by a 600-hr $T_{SOR}$ (start of run temperature) in any range disclosed herein, e.g., from about 930° F. (499° C.) to about 960° F. (516° C.), or from about 940° F. (504° C.) to about 955° F. (513° C.).

Aspect 49. The method defined in any one of the preceding aspects, wherein the supported catalyst is characterized by a 600-hr Fouling Rate in any range disclosed herein, e.g., less than about 0.02° F./hr (0.01° C./hr), or less than about 0.01° F./hr (0.006° C./hr).

Aspect 50. The method defined in any one of the preceding aspects, wherein the supported catalyst is characterized by a 600-hr $H_2/CH_4$ yield in any range disclosed herein, e.g., from about 30 to about 47%, or from about 35 to about 45%.

Aspect 51. The method defined in any one of the preceding aspects, wherein the supported catalyst is characterized by a 2500-hr $T_{EOR}$ (end of run temperature) less than that of an otherwise identical catalyst prepared under the same catalyst preparation conditions without the alcohol compound, and evaluated under the same 2500-hr aromatization reaction conditions.

Aspect 52. The method defined in any one of the preceding aspects, wherein the supported catalyst is characterized by a 2500-hr $T_{SOR}$ (start of run temperature) less than that of an otherwise identical catalyst prepared under the same catalyst preparation conditions without the alcohol compound, and evaluated under the same 2500-hr aromatization reaction conditions.

Aspect 53. The method defined in any one of the preceding aspects, wherein the supported catalyst is characterized by a 2500-hr aromatics selectivity (or a 2500-hr benzene+toluene selectivity) that is greater than that of an otherwise identical catalyst prepared under the same catalyst preparation conditions without the alcohol compound, and evaluated under the same 2500-hr aromatization reaction conditions.

Aspect 54. A supported catalyst obtained by the method defined in any one of the preceding aspects, e.g., a supported aromatization catalyst.

Aspect 55. A reforming process comprising contacting a hydrocarbon feed with a supported aromatization catalyst under reforming conditions in a reactor system to produce an aromatic product, wherein the supported aromatization catalyst is the supported catalyst (or the reduced or activated catalyst) defined in any one of the preceding aspects.

Aspect 56. The process defined in aspect 55, wherein the hydrocarbon feed is any hydrocarbon feed disclosed herein, e.g., comprising non-aromatic hydrocarbons, comprising $C_6$-$C_9$ alkanes and/or cycloalkanes, or comprising $C_6$-$C_8$ alkanes and/or cycloalkanes.

I claim:

1. A method of producing a supported catalyst, the method comprising:
   (a) impregnating a bound zeolite base with, in any order:
      a transition metal precursor in a solvent composition containing water and from about 5 wt. % to about 50 wt. % of a $C_1$ to $C_3$ alcohol compound,
      a chlorine precursor, and
      a fluorine precursor, to form an impregnated zeolite base; and
   (b) drying and then calcining the impregnated zeolite base to produce the supported catalyst, wherein the supported catalyst comprises, based on the total weight of the supported catalyst:
      from about 0.1 wt. % to about 10 wt. % of a transition metal;
      from about 0.1 wt. % to about 5 wt. % of chlorine; and
      from about 0.1 wt. % to about 5 wt. % of fluorine.

2. The method of claim 1, wherein the bound zeolite base is impregnated with the chlorine precursor and/or the fluorine precursor before the transition metal precursor.

3. The method of claim 1, wherein the bound zeolite base is impregnated with a solution containing water and the chlorine precursor and/or the fluorine precursor.

4. The method of claim 1, wherein the bound zeolite base is impregnated with the transition metal precursor, the chlorine precursor, and the fluorine precursor in the solvent composition containing water and from about 5 wt. % to about 50 wt. % of the $C_1$ to $C_3$ alcohol compound.

5. The method of claim 1, wherein the alcohol compound comprises ethanol.

6. The method of claim 1, wherein:
   the solvent composition contains from about 10 wt. % to about 40 wt. % of the $C_1$ to $C_3$ alcohol compound; and the bound zeolite base comprises from about 5 wt. % to about 30 wt. % of a binder, based on the total weight of the bound zeolite base.

7. The method of claim 6, wherein:
the bound zeolite base comprises a silica-bound L-zeolite; and
the transition metal comprises platinum.

8. The method of claim 7, wherein the supported catalyst comprises:
from about 0.5 wt. % to about 3 wt. % of platinum;
from about 0.4 wt. % to about 3.5 wt. % of chlorine; and
from about 0.3 wt. % to about 2 wt. % of fluorine.

9. The method of claim 1, further comprising the following steps before step (a):
combining a zeolite with a binder to form a mixture, and extruding the mixture to form an extrudate;
drying and calcining the extrudate to form a calcined base; and
washing, drying, and calcining the calcined base to form the bound zeolite base.

10. The method of claim 1, wherein:
the transition metal precursor comprises tetraamineplatinum(II) chloride, tetraamineplatinum(II) nitrate, platinum(II) acetylacetonate, platinum(II) chloride, ammonium tetrachloroplatinate(II), chloroplatinic acid, platinum (II) nitrate, or a combination thereof;
the chlorine precursor comprises ammonium chloride, tetramethylammonium chloride, tetraethylammonium chloride, tetrapropylammonium chloride, tetrabutylammonium chloride, methyltriethylammonium chloride, or a combination thereof; and
the fluorine precursor comprises ammonium fluoride, tetramethylammonium fluoride, tetraethylammonium fluoride, tetrapropylammonium fluoride, tetrabutylammonium fluoride, methyltriethylammonium fluoride, or a combination thereof.

11. The method of claim 1, wherein:
the bound zeolite base comprises a silica-bound L-zeolite; and
the supported catalyst comprises:
from about 0.7 wt. % to about 1.5 wt. % of platinum;
from about 0.5 wt. % to about 3.3 wt. % of chlorine; and
from about 0.3 wt. % to about 2 wt. % of fluorine.

12. The method of claim 11, wherein the supported catalyst has a platinum dispersion that is substantially the same as that of an otherwise identical catalyst prepared under the same catalyst preparation conditions without the alcohol compound.

13. The method of claim 11, wherein the supported catalyst is characterized by a platinum dispersion in a range from about 60% to about 80%.

14. The method of claim 1, wherein the method further comprises a reducing step after the drying and calcining of the impregnated zeolite base, the reducing step comprising contacting the supported catalyst with a reducing gas stream to produce an activated catalyst.

15. The method of claim 14, wherein:
the bound zeolite base comprises a silica-bound L-zeolite; and
the supported catalyst comprises:
from about 0.5 wt. % to about 3 wt. % of platinum;
from about 0.4 wt. % to about 3.5 wt. % of chlorine; and
from about 0.3 wt. % to about 2 wt. % of fluorine.

16. The method of claim 14, wherein the solvent composition contains from about 10 wt. % to about 40 wt. % of ethanol.

17. The method of claim 16, wherein the bound zeolite base is impregnated with the transition metal precursor, the chlorine precursor, and the fluorine precursor in the solvent composition.

18. An activated aromatization catalyst obtained by the method of claim 14.

19. A reforming process comprising:
contacting a hydrocarbon feed with the activated aromatization catalyst of claim 18 under reforming conditions in a reactor system to produce an aromatic product.

20. The process of claim 19, wherein the hydrocarbon feed comprises $C_6$-$C_8$ alkanes and/or cycloalkanes.

* * * * *